United States Patent
Mehl

(10) Patent No.: US 11,504,772 B2
(45) Date of Patent: Nov. 22, 2022

(54) METHOD FOR PROVIDING A FLOW FOR AN ADDITIVE MANUFACTURING DEVICE

(71) Applicant: EOS GmbH Electro Optical Systems, Krailling (DE)

(72) Inventor: Sebastian Mehl, Puchheim (DE)

(73) Assignee: EOS GmbH Electro Optical Systems, Krailling (DE)

( * ) Notice: Subject to any disclaimer, the term of this patent is extended or adjusted under 35 U.S.C. 154(b) by 503 days.

(21) Appl. No.: 16/558,590

(22) Filed: Sep. 3, 2019

(65) Prior Publication Data

US 2020/0078864 A1 Mar. 12, 2020

(30) Foreign Application Priority Data

Sep. 7, 2018 (DE) .......................... 102018215302.7

(51) Int. Cl.
*B22F 12/00* (2021.01)
*B33Y 30/00* (2015.01)
*B33Y 40/00* (2020.01)
*B23K 26/00* (2014.01)
*B33Y 10/00* (2015.01)
*B22F 10/00* (2021.01)
(Continued)

(52) U.S. Cl.
CPC ............ *B22F 12/00* (2021.01); *B23K 26/128* (2013.01); *B23K 26/1438* (2015.10); *B23K 26/342* (2015.10); *B33Y 30/00* (2014.12); *B33Y 40/00* (2014.12); *B22F 10/10* (2021.01); *B33Y 10/00* (2014.12)

(58) Field of Classification Search
CPC .......... B22F 12/00; B22F 10/10; B22F 10/20; B23K 26/128; B23K 26/1438; B23K 26/342; B33Y 30/00; B33Y 40/00; B33Y 10/00; Y02P 10/25; B29C 64/153; B29C 64/364; B29C 64/371

See application file for complete search history.

(56) References Cited

U.S. PATENT DOCUMENTS

| | | |
|---|---|---|
| 2016/0121398 A1 | 5/2016 | Schlick et al. |
| 2016/0136731 A1 | 5/2016 | McMurtry et al. |
| 2018/0126460 A1 | 5/2018 | Murphree et al. |

FOREIGN PATENT DOCUMENTS

| | | | |
|---|---|---|---|
| DE | 102006014835 | 10/2007 | |
| DE | 102006014835 A1 * | 10/2007 | ......... B01D 46/0091 |

(Continued)

*Primary Examiner* — Anthony M Liang
*Assistant Examiner* — Danny N Kang
(74) *Attorney, Agent, or Firm* — Seyfarth Shaw LLP

(57) ABSTRACT

In a method of providing a flow for a process chamber of a device for producing a three-dimensional object by layer-wise application and selective solidification of a building material in a build area a process gas is supplied to the process chamber in a lower altitude region of the process chamber, wherein the process chamber includes a gas inlet for introducing the process gas into the process chamber and a gas outlet for discharging the process gas from the process chamber. The gas inlet and the gas outlet are provided in the lower altitude region of the process chamber and the process gas flows in a main flow from the gas inlet to the gas outlet, and wherein a secondary flow is located in a sub-region of the lower altitude region, which sub-region is located above a bottom surface of the process chamber surrounding the build area.

21 Claims, 7 Drawing Sheets

(51) Int. Cl.
   *B23K 26/14*   (2014.01)
   *B23K 26/342*  (2014.01)
   *B23K 26/12*   (2014.01)
   *B22F 10/10*   (2021.01)

(56)         References Cited

FOREIGN PATENT DOCUMENTS

| EP | 2862651    | 4/2015 |
| EP | 3015197    | 3/2017 |
| EP | 3147047    | 3/2017 |
| WO | 2018086887 | 5/2018 |

* cited by examiner

METHOD FOR PROVIDING A FLOW FOR AN ADDITIVE MANUFACTURING DEVICE

TECHNICAL FIELD OF THE INVENTION

The present application refers to a method of providing a flow for a process chamber of a device for additively producing a three-dimensional object and to such a device.

BACKGROUND OF THE INVENTION

Devices and methods of this kind are used, for example, in rapid prototyping, rapid tooling or additive manufacturing. An example of such a method is known as "selective laser sintering or laser melting". In this method, repeatedly a thin layer of a building material in powder form is applied and the building material is selectively solidified in each layer by selectively irradiating positions corresponding to a cross-section of the object to be produced with a laser beam.

Devices and methods of this kind are used, for example, in rapid prototyping, rapid tooling or additive manufacturing. An example of such a method is known as "selective laser sintering or laser melting". In this method, repeatedly a thin layer of a building material in powder form is applied and the building material is selectively solidified in each layer by selectively irradiating positions corresponding to a cross-section of the object to be produced with a laser beam.

The energy input during selective solidification can generate impurities such as splashes, fumes, smokes, vapors and/or gases, which propagate from the build area into the process chamber. Moreover, when a building material in powder form is used, impurities may be generated by swirling up the powder or powder dust in the process chamber. Impurities can affect the manufacturing process negatively, for example by absorbing, scattering or deflecting the scanning laser beam, by condensing on a coupling window for the laser beam or by depositing on a building material layer. In order to meet high quality and efficiency requirements on the manufacturing process, such impurities thus need to be removed from the process chamber as quickly as possible.

In order to do so, usually a gas flow is introduced into the process chamber through a gas inlet in a lower altitude region of the process chamber and is discharged again from the process chamber through a gas outlet so that a gas flow is generated which is substantially directed from the gas inlet to the gas outlet, hereinafter also referred to as main flow or main gas flow. The gas inlet and the gas outlet generally have a width, i.e. a dimension transverse to a main flow direction of the main gas flow, that is smaller than the width of the process chamber. Furthermore, the gas flow usually propagates in a non-guided manner in the process chamber, i.e. after entering the process chamber, the gas is not guided by a device comprising a narrow cavity such as a tube or a channel. In this context, the process chamber itself with its side walls as well as its bottom and top surfaces is not to be understood as flow-guiding in the sense of a channel or a guiding means, since its cross-section is a multiple of the gas supply cross-section or the gas inlet cross-section and within the process chamber, the gas flow may be subjected to almost any uncontrolled change of its flow properties, wherein the wall of the process chamber only has a flow guiding function to a very limited extent. Thus, in the lower altitude region of the process chamber and at the side of the gas flow, i.e. transverse to its main flow direction, there are regions of the process chamber in which a flow is not deliberately generated. These regions in which a flow is not deliberately generated may negatively affect the flow properties of the main flow. For example, the main flow can spread into these lateral regions or divert into them, whereby the main flow spreads as the flow progresses, i.e. at an increasing distance from the gas inlet, and the flow velocity decreases. On the other hand, in the lateral regions at the side of the main flow in which no flow is deliberately generated, further flows, in particular turbulences, may form, which in turn affect the flow properties of the main flow negatively.

SUMMARY OF THE INVENTION

It is an object of the present invention to provide an alternative or improved method of providing a flow for a process chamber and an alternative or improved device for additively producing a three-dimensional object by layer-wise application and selective solidification of a building material, by means of which in particular the efficiency of removal of impurities from the process chamber, which impurities are generated, among other things, by the selective solidification of the building material, can be enhanced.

This object is achieved by a method of providing a flow for a process chamber, a method of producing a three-dimensional object, a flow providing device, and a manufacturing device.

The methods can also be further developed by the features of the devices, which features are given below and in the dependent claims, and vice versa, and the features of the devices and of the methods can further be combined among each other.

A method according to the invention serves for providing a flow for a process chamber of a device for producing a three-dimensional object by layer-wise application and selective solidification of a building material in a build area. In this method, i.e. this method of providing a flow, a process gas is supplied to the process chamber in a lower altitude region (or height region) of the process chamber, wherein the process chamber comprises a gas inlet for introducing the process gas into the process chamber and a gas outlet for discharging the process gas from the process chamber, wherein the gas inlet and the gas outlet are provided in the lower altitude region of the process chamber and wherein the process gas flows in a main flow from the gas inlet to the gas outlet and wherein a secondary flow is located in a sub-region of the lower altitude region, which sub-region is located above a bottom surface of the process chamber surrounding the build area. In this method, a boundary zone is positioned at least in a section between the secondary flow and the main flow at least during the selective solidification of at least one layer of the building material and substantially in that sub-region of the lower altitude region that is located above the bottom surface surrounding the build area, due to at least one of the following influencing measures:

Influencing measure I: positioning at least one guide element as boundary zone in the process chamber, wherein the at least one guide element has at least one guide face for guiding the main flow and/or the secondary flow at least in a section;

Influencing measure II: Modifying the flow properties of the secondary flow in a controlled manner and at least in a section thereof, in particular in its direction and/or velocity and/or its volumetric flow rate;

Influencing measure III: Displacing, in a controlled manner, the secondary flow at least in a section thereof.

In the context of the application, the process chamber is meant to be a cavity within an additive manufacturing device, which cavity is partially bounded at the bottom by the build area. The build area forms part of a bottom area on a lower side of the process chamber. The process chamber is a cavity which, with the exception of the gas inlet and the gas outlet and possibly further gas inlets and/or gas outlets, is sealed substantially gas-tight at least during operation of the manufacturing device. Below the process chamber a building container is provided in which the three-dimensional object is built. During operation of the manufacturing device, the building container is bounded at the top by the build area so that the build area forms a boundary region between the process chamber and the build area.

In the context of the present application, a lower altitude region of the process chamber is meant to be a region of the process chamber in the vicinity of the build area, which region is substantially defined by a defined height, i.e. which is a vertically limited region of the process chamber. The lower altitude region extends within a region of the process chamber with a vertical extent of preferably 30% at most, further preferably 20% at most, particularly preferably 15% at most of the maximum clear process chamber height. In general, in the context of the present application, the maximum clear height of the process chamber or the distance of the build area from the ceiling of the process chamber is meant to be the distance of the build area, i.e. the working plane, from a highest point of the interior or cavity of the process chamber.

Preferably the gas inlet and/or gas outlet are configured to be stationary relative to the process chamber. Particularly preferably, the gas inlet and/or the gas outlet are/is arranged in the process chamber wall and controlled in such a way that they generate a global flow across the build area by the main flow, i.e. the main flow is directed specifically towards the entire region of the process chamber which lies directly above the build area. In other words, the main flow flows across at least the entire build area and, possibly, across further areas around the build area, in particular areas located in the main flow direction ahead (upstream) of the build area and behind (downstream) the build area.

In the context of the application, a gas inlet is meant to be in particular an opening permeable to gas or a plurality of such openings within the process chamber or in a wall of the process chamber, through which opening(s) a gas flow flows into the process chamber during the method of providing a flow. In the context of the application, a gas outlet is meant to be in particular an opening permeable to gas or a plurality of such openings within the process chamber or in a wall of the process chamber, through which opening(s) a gas flow flows out of the process chamber during the method of providing a flow. The process chamber can also comprise further gas inlets and/or outlets, for example at an upper altitude region located above the lower altitude region of the process chamber.

As described above, the gas inlet and the gas outlet are provided at the lower altitude region of the process chamber and the process gas flows in a main flow from the gas inlet to the gas outlet, i.e. the process gas of the main flow flows across the build area. The main flow is a flow as homogeneous as possible having a horizontal extent that allows to completely cover the region of the process chamber directly above the build area. Vice versa, the main flow is typically formed such that it does not specifically flow through the upper altitude region of the process chamber adjacent to the ceiling of the process chamber. The main flow serves for the purpose of removing atmospheric impurities from the process chamber, in particular in order to be able to produce three-dimensional objects with properties that are as defined as possible, e.g. having a high tensile strength.

The secondary flow is preferably not a directional flow and/or a flow generated specifically in the process chamber or introduced into the process chamber, but an undirectedly moving gas volume. The secondary flow can be present in all areas of the process chamber which are not directionally or specifically subjected to a gas flow such as the main flow. It can be highly turbulent and interacts at least with the main flow. The secondary flow can be driven and/or fed by the main flow. It often cannot be assigned uniform flow properties such as flow direction, velocity, volumetric flow rate and/or mass flow. However, the secondary flow can enter into an equilibrium relationship with the main flow, which equilibrium relationship is stable within a certain tolerance. In this case, for example, a local flow direction and/or velocity of the secondary flow can be determined, for example using a computer-aided simulation and/or a measurement. In particular, the secondary flow can be caused by the main flow spreading or diverting into boundary regions of the process chamber in which no flow is deliberately generated, i.e. transversely to the direction of the main flow into regions which are not deliberately covered by the main flow, in particular in the form of turbulences. Alternatively or additionally, the secondary flow can also be caused or influenced, e.g. enhanced, by further flows within the process chamber and/or by thermal effects.

The terms main flow and secondary flow refer to flows of process gas flowing partially non-guided within the process chamber and which are not guided in a completely (i.e. in all directions transverse to a main flow direction) closed channel such as a hose or tube. Thus, the main flow and the secondary flow do not flow in completely separate spaces, but can interact indirectly with each other at least in certain areas, e.g. in any horizontal and/or vertical region within the process chamber. Accordingly, in the context of the invention, a main gas flow limited laterally by guide elements is understood as a partially non-guided main gas flow as described above, if the guide elements occupy a certain minimum distance from each other, e.g. the length of one build area side in the case of a rectangular build area or the build area diameter in the case of a circular build area, and/or if the guide elements do not completely enclose the main gas flow transversely to the main flow direction, i.e. the main gas flow is not limited, e.g. to its top, by guide elements. This also applies if the guide elements lead or guide or shield at least a section of the main gas flow. Applying this description to a tube or a pipe, one could speak of a partially non-guided gas flow if the tube or pipe has an opening of e.g. 40% of the entire wall surface (e.g. a cylinder side surface). This opening can, for example, extend from the beginning to the end of the tube or pipe or can have a limited extent along the extension direction of the tube or pipe, e.g. the opening can account for less than 100% of the circumference of the wall of the tube or pipe over a certain length. Preferably, with respect to its cross-section directly after leaving the gas inlet into the process chamber, the main flow flows into the process chamber guided by at least 30% of a virtual enveloping surface and/or flows into the process chamber guided by at most 80%, preferably at most 70%, more preferably at most 60% of a virtual enveloping surface, wherein the enveloping surface is determined from the cross-sectional circumference and the flowing distance of the main flow within the process chamber.

In order to allocate or distinguish the main flow from the secondary flow, in particular flow vectors can be determined at one or several defined heights (e.g. 1 cm) above the bottom of the process chamber, wherein the main flow is defined as the gas volume which flows in the region between the gas inlet and the gas outlet from the gas inlet substantially in the main flow direction to the gas outlet within the process chamber. The term "substantially in a main flow direction" takes into account deviations from the main flow direction up to 30° at most, preferably 20° at most, particularly preferably 10° at most. The flow vectors can be determined e.g. by simulation and/or measurement.

The boundary zone is a spatial region or a structural element having a definable extent transverse to the main flow direction, i.e. a specifically positioned boundary between the main flow and the secondary flow. Depending on the influencing measure, a distance between the main flow and the secondary flow can be selected varyingly. If a guide element (see below) in the form of a rolled sheet is used, the distance can be a few millimeters, for example, whereas in the case that the boundary zone is formed by means of a flow, i.e. by positioning of a guide gas flow (see below), the distance can be a few centimeters, for example. Positioning can imply providing the boundary zone at a position of the process chamber and orienting the boundary zone in several spatial directions and preferably also includes determining or adjusting the size, i.e. extent, of the boundary zone within the cavity of the process chamber. The boundary zone is placed in a region outside the build area, in particular to the side of the build area, or above a bottom area of the process chamber which does not include the build area, so that the boundary zone is preferably not provided in a region of the main flow.

The boundary zone is preferably a structural element, i.e. a guide element further described below, which is positioned between the main flow and the secondary flow. Such a boundary zone can, for example, prevent or at least reduce the diversion or spreading of the main flow into regions of the process chamber in which regions no flow is to be deliberately generated and/or spatially separate the main flow from the secondary flow, at least in a section thereof, in order to prevent or at least reduce the influence of the secondary flow on the main flow. Preventing the main flow from spreading can, in particular on average, result in a higher velocity of the main flow, with a significant advantage often being recognizable after a certain distance which the main flow has covered in the process chamber. Overall, an improvement of the flow properties of the main flow can thus be achieved, in particular a homogenization of the flow properties of the main flow.

Alternatively or in addition to such a structural element, i.e. a guide element, a further gas flow, i.e. a guide gas flow further described below, can be generated in the process chamber. The guide gas flow serves, analogous to a guide element mentioned above, for a spatial separation between the main flow and the secondary flow by forming an interaction zone between the main flow and the secondary flow. Its flow properties can be adjusted so that the boundary zone is positioned so that it is not located above the build area, but above a bottom surface located as close as possible to the build area. It can be configured to flank the main flow and at the same time to interact with the secondary flow. Preferably, the guide gas flow in interaction with the secondary flow is oriented so that it does not flow above the build area but on the side of the build area. In addition, the guide gas flow can influence the flow properties of the main flow and/or the secondary flow, in particular in such a way that homogeneity of the flow properties of the main flow is improved and/or the secondary flow is attenuated and/or displaced at least in a section. Thus, the guide gas flow can serve as a boundary zone by means of which, for example, an improvement of the flow properties of the main flow can be achieved, in particular a homogenization of the flow properties of the main flow.

Alternatively or in addition, it is furthermore possible to supply a further gas flow into the process chamber in such a way and/or to locally withdraw the secondary flow from the process chamber by means of a further provided secondary gas outlet, so that the secondary flow is influenced in such a way that it is attenuated and/or displaced at least in a section. Thus at least one region of the secondary flow, which region is influenced by such measures, can serve as an interaction zone between the main flow and the secondary flow and thus as a boundary zone.

It should be mentioned here that the process chamber wall or the process chamber housing, a housing or a wall of a recoater provided in the process chamber, a housing of a device for locally introducing and/or discharging of process gas, e.g. a local gas injection or gas extraction system, or housings of other devices which can be positioned within the process chamber and have a non-flow-forming purpose, e.g. a heating device, a print head or a support device for such devices, are not to be understood as a guide element in the sense of the present application.

In general, by means of the inventive positioning of a boundary zone, an improvement, in particular a homogenization, of the main flow and thus an improvement of the object quality by means of an improved removal of impurities can be achieved.

Preferably, the boundary zone is positioned in a lower region of the process chamber and above a bottom surface of the process chamber which bottom surface is not the build area. Further preferably, the boundary zone in addition is not positioned in the main flow direction between the gas inlet and the build area and between the build area and the gas outlet. Particularly preferred, in a top view, the boundary zone is positioned substantially parallel to one side or parallel to mutually parallel opposite sides of a rectangular build area beside the build area.

Preferably, a maximum horizontal extent of the gas inlet and/or of the gas outlet corresponds to at least 80%, preferably at least 100%, particularly preferably at least 120% of an extent of the build area, in particular of a length of an adjacent build area side of a rectangular build area and/or a longest build area diagonal of a polygonal build area and/or a build area diameter of a circular build area.

Such a dimensioning of the gas inlet and/or gas outlet can, for example, enable the formation of a main flow which flows across the entire build are, i.e. globally. This makes it possible in particular to achieve a good removal of impurities from the process chamber. Since the main flow flows across the build area, i.e. in the lower altitude region of the process chamber, in particular impurities can be removed as close as possible to their point of origin, i.e. the build area, and thus spread into the process chamber to a reduced extent.

When applying the influencing measure I, i.e. that at least one guide element is positioned as the boundary zone in the process chamber, wherein the at least one guide element has at least one guide face for guiding the main flow and/or the secondary flow at least in a section thereof, the at least one guide element preferably has a first end which is positioned at the gas inlet at least during the selective solidification of at least one layer of the building material. More preferably the first end of the guide element is positioned at the gas inlet in a gap-free manner.

At least sectional leading or at least sectional guidance of a flow can also mean shielding of the flow, for example depending on the influencing measure selected. Thus, both the main flow and the secondary flow can be shielded by the guide element. For example, the secondary flow can be shielded by the guide element so that it can no longer influence the main flow or only to a lower extent. In other words, in this case the secondary flow is lead or guided by the guide element in such a way that the main flow is shielded from the secondary flow. Two guide faces are necessary to enable simultaneous leading or guidance of both the main flow and the secondary flow. Since the guide element is usually a three-dimensional body it is possible, for example, to provide a single guide element with two such guide faces, one of which is configured to lead or guide the main flow and the other one is configured to lead or guide the secondary flow. Alternatively, several guide elements can be used for this purpose.

A method of positioning can be, for example, mechanical, electrical or (electro-)magnetic and/or fluidic. A positioning can be fixed, i.e. non-removably, or reversible. For example, the guide element can have a support arm for attachment or can be configured as a support arm, or the attachment of the guide element can be integrally provided with the gas inlet or a gas inlet element arranged therein.

The term "gap-free" or "without a gap" permits small gaps which can occur within the frame of the positioning methods mentioned, for example as a result of a structure respectively selected, e.g. a gap with an extent of a few millimeters, e.g. 2 mm.

By positioning the guide element at the gas inlet, in particular positioning at the gas inlet in a gap-free manner, it is possible, for example, to allow for at least sectional guidance and/or leading and/or shielding of the main gas flow immediately after its exit from the gas inlet into the process chamber. At this position, an influence on the main gas flow introduced into the process chamber can have particularly undesirable effects under certain circumstances, for example because an initial change in the flow direction can affect its entire progress in the process chamber up to the gas outlet.

Preferably, the first end of the at least one guide element, which first end, as described above, is positioned at the gas inlet at least during selective solidification of at least one layer of the building material, has a vertical dimension which is larger than or equal to a vertical extent of the opening of the gas inlet.

The vertical dimension of the first end is preferably a dimension of the first end perpendicular to the build area, i.e. an extent in height. Such a dimension, in particular extent in height, can be e.g. 5 cm, 10 cm or 20 cm.

As a result of the vertical extent of the first end corresponding at least to the vertical extent of the opening of the gas inlet it is possible, for example, to achieve a reliable guiding and/or leading and/or shielding over that altitude range in which process gas flows into the process chamber.

Further, the guide element is preferably positioned such that in an orthogonal projection of the gas inlet and the guide element onto the plane of the build area, the opening of the gas inlet is arranged at a first distance from the build area and a second end of the guide element is arranged at a second distance from the build area, wherein the second distance is smaller than the first distance, wherein the second distance is more preferably at least 1 cm, even more preferably at least 5 cm, particularly preferably at least 10 cm smaller than the first distance.

The guide element may be, for example, an extension of the gas inlet in a section thereof, e.g. the continuation of a side or a segment of a channel of the gas inlet. By means of this, for example, selectively guiding and/or leading and/or shielding of the main gas flow can be achieved immediately after the gas flow exits the gas inlet into the process chamber, i.e. where influencing the gas flow introduced into the process chamber can have particularly undesirable effects.

Further, the guide element preferably is positioned such that in an orthogonal projection of the gas inlet onto the plane of the build area the guide face of the at least one guide element is oriented substantially perpendicular to a plane of the gas inlet opening.

In the case that the gas inlet comprises a plurality of gas inlet channels the guide element is thus preferably positioned such that the guide face is oriented substantially parallel to an extension direction of the inlet channels and/or the guide face is oriented substantially parallel to a direction in which the main flow exits from the gas inlet into the process chamber.

This makes it possible, for example, to improve the directional stability of the main flow, since the guide element shields the main flow laterally from a potentially adverse effect of the secondary flow, thereby improving directional stability or reducing velocity loss, for example.

Alternatively, the guide element preferably is positioned such that in an orthogonal projection of the gas inlet onto the plane of the build area the guide face of the at least one guide element is oriented at an angle larger than 0° to a perpendicular to a plane of the gas inlet opening, wherein more preferably the guide face and the extension direction of the inlet channels form an angle of at least 3°, more preferably at least 5°, even more preferably at least 10° and/or of 30° at most, more preferably 20° at most, particularly preferably 15° at most.

This makes it possible, for example, to generate a guide gas flow or to guide or lead, by means of the guide element, a guide gas flow introduced through the gas inlet, wherein the guide gas flow flows into the process chamber at an angle greater than 0° to the main flow direction. As already described above and further below, such a guide gas flow can serve as an additional or alternative boundary zone, for example.

Preferably at least two guide elements are positioned in the process chamber, wherein a first one of the guide elements is positioned at a first end of the gas inlet and a second one of the guide elements is positioned at a second end of the gas inlet.

The ends of the gas inlet refer to longitudinal ends of the gas inlet as a result of a typically elongated (during operation in the additive manufacturing device the horizontal) extension of the gas inlet, in particular if the gas inlet is understood as a recess in the process chamber wall and a supply line is not taken into account. In particular, the ends of the gas inlet thus refer to a direction transverse to the main flow direction of the main flow.

By positioning two guide elements in this way, it is possible, for example, to frame the main flow laterally by means of the guide elements and thus effectively guide or shield the main flow. This can have in particular an advantageous effect if there are relatively large distances to the side of the gas inlet (i.e. in the extension of the ends of the gas inlet) to the process chamber wall and thus relatively large regions of the process chamber are present, in which regions a flow is not deliberately provided or in which regions the secondary flow forms, and in which regions, for example, hardly controllable turbulences with an undesirable effect on the main flow can form.

Alternatively or in addition to positioning the guide element at the gas inlet, as described above, using the influencing measure I, i.e. positioning the at least one guide element as the boundary zone in the process chamber, wherein the at least guide element comprises at least one guide face for guiding the main flow and/or the secondary flow at least in a section thereof, the at least one guide element can be positioned in the process chamber at a distance from the gas inlet.

The phrase "at a distance from" implies a significantly greater distance than may be required by structural necessities, as described above. Such a distance from the gas inlet is preferably at least 5 cm. The phrase "at a distance from" here means a minimum distance. With a certain extent and orientation of the guide element, there can be a considerable distance, e.g. 30 or 50 cm, between the minimum distance and a maximum distance of the guide element to the gas inlet.

With such a guide element that is at a distance from the gas inlet, it is possible, for example, to enable a guidance or shielding of the main flow and/or the secondary flow also at a distance from the gas inlet, i.e. in a further course of the main flow.

Preferably, the at least one guide element, i.e. the guide element positioned at a distance from the gas inlet as described above, is positioned such that in an orthogonal projection of the gas inlet onto the plane of the build area the guide face of the guide element is oriented substantially perpendicular to a plane of the gas inlet opening or is oriented at an angle of 30° at most, preferably of 20° at most, more preferably of 10° at most, particularly preferably of 5° at most to a perpendicular to a plane of the gas inlet opening.

This means that the guide element is preferably positioned such that it or its guide face is directed substantially parallel to the main flow direction of the main flow. This makes it possible, for example, to achieve particularly good guidance of the main flow.

Preferably, the at least one guide element, i.e. the guide element described above that is positioned at a distance from the gas inlet, has a first end and the guide element is positioned such that the first end is substantially beside the build area with respect to the direction of the main flow. Further preferably the guide element further has a second end and the guide element is positioned such that the second end is positioned at a greater distance from the gas inlet than the first end of the guide element with respect to the direction of the main flow.

The term "beside the build area" means laterally beside the build area in a direction transverse to the main flow. The preferred embodiment described here refers to a view in the orthogonal projection, i.e. not necessarily in the same horizontal plane. The term "beside" therefore means in relation to the progress direction of the main flow relative to the build area not in front of and not behind the build area. The guide element is therefore preferably provided in the process chamber in such a way that it is not perpendicular to the main flow direction or to an orientation of the gas inlet channels of the gas inlet. This can, for example, also enable an advantageous guidance of the main flow. Particularly preferably, all guide elements according to the first inventive influencing measure, which are positioned at a distance from the gas inlet in the process chamber, are configured and designed in accordance with the embodiment just described.

Preferably, the at least one guide element, i.e. the guide element described above which is positioned at a distance from the gas inlet, is substantially positioned between a door of the process chamber and the build area.

Since in particular between the build area and the door of the process chamber a large region of the process chamber can be located, through which region the main flow does not specifically flow, disturbing secondary flows can form in this region particularly well, i.e. by positioning the guide element in this region a particularly good improvement of the flow properties of the main flow can be achieved, in particular with regard to its directional stability.

Preferably, at least two guide elements, i.e. at least two guide elements described above which are positioned at a distance from the gas inlet, are positioned in the process chamber such that in an orthogonal projection of the guide elements onto the plane of the build area the guide elements flank the sides of a substantially rectangular build area, which sides are arranged mutually parallel.

This can, for example, permit the main flow to spread out for a higher flow velocity and thus allow for a better cleansing effect, especially with an increasing flow distance of the main flow within the process chamber, i.e. in the further course of the main flow.

Preferably the at least one guide element is configured and/or positioned in the process chamber such that it is movably provided in the process chamber, in particular displaceable and/or pivotably provided in the process chamber. This can apply to the guide element described above which is positioned at the gas inlet as well as to the guide element described above which is provided at a distance from the gas inlet.

For example, the guide element can be configured to be brought, on the one hand, into an operative position which is stationary relative to the build area and in which the guide face(s) of the guide element is/are provided in the process chamber in such a way that it is/they are configured to guide at least a section of the main flow and/or the secondary flow, and, on the other hand, into a rest position which differs from the operative position and in which the guide face(s) of the guide element is/are provided in the process chamber in such a way that it is/they are not configured to guide the main flow and/or the secondary flow. In particular, the guide element can be designed and/or controlled such that it is provided in the operative position at least during the selective solidification of a layer of the building material. A change between the operative position and the rest position can be implemented by moving the guide element, e.g. by displacing and/or pivoting the guide element.

This makes it possible, for example, to adapt the guide element or its position to a particular situation or process state in the process chamber. For example, a guide element provided in a travel path of the recoater can be brought into the rest position during movement of the recoater, i.e. during the application of a further layer of the building material, in which rest position it does not obstruct the movement of the recoater.

Other preferred embodiments and/or arrangements of the at least one guide element, which can also be combined among one another and which can be applied both to the guide element described above that is positioned at the gas inlet and to the guide element described above that is positioned at a distance from the gas inlet, are as follows:

The guide face of the guide element is arranged substantially perpendicular to a plane of the build area, wherein a deviation from the perpendicular is preferably 30° at most, more preferably 20° at most, particularly preferably 10° at most. This can, for example, allow for guiding the main flow particularly well.

In an orthogonal projection of the guide face onto a plane of the build area, the guide face is in a longitudinal extension directed to an area outside the build area. This can, for example, enable the main flow to globally flow across the build area.

The at least one guide element is formed separately from the wall of the process chamber. Thus, for example, the guide element can be provided in a simple way.

An extent of the guide element in a direction parallel to the build area corresponds to at least 0.5%, preferably at least 2%, particularly preferably at least 10% and/or 100% at most, preferably 80% at most, particularly preferably 60% at most of the distance of the gas outlet from the gas inlet. Thus, for example, a guide element is provided that is adapted to a dimension of the process chamber.

The guide element has substantially a longitudinal extent parallel to the build area and substantially a height extent perpendicular to the build area, wherein a thickness of the guide element perpendicular to the longitudinal extent and the height extent is several times (e.g. ten or twenty times) smaller than in the longitudinal extent and in the height extent. Thus, a guide element is provided that is substantially composed of two guide faces, wherein the extent of the guide element perpendicular to the guide faces, i.e. its thickness, is negligibly small. This has the advantage, for example, that impurities cannot settle on the guide element or only to a small extent.

While implementing the influencing measure II, i.e. that flow properties of the secondary flow are modified in a controlled manner at least in a section of the secondary flow, in particular the direction and/or the velocity and/or the volumetric flow rate of the secondary flow, at least sectional modification of the secondary flow is preferably implemented by introducing at least one guide gas flow into the process chamber, wherein at least a section of the at least one guide gas flow flows through the sub-region of the lower altitude region that is located above the bottom surface surrounding the build area.

This makes it possible, for example, to provide a further boundary layer alternatively or in addition to the guide element described above, which boundary layer can in particular improve the flow properties of the main flow. Introducing such a guide gas flow into the process chamber as a boundary zone in particular provides a boundary layer in the form of a further flow which can have, for example, the advantage that no further structural elements such as a guide element described above are required or that the number of such structural elements can at least be reduced.

In this method, it is preferred that the guide gas flow flows into the process chamber through a guide inlet channel provided at the gas inlet or provided separately from the gas inlet.

For example, a guide inlet channel can have the advantage that it can already specify a direction in which the guide gas flow flows into the process chamber, wherein the direction can in particular be chosen independently of a main flow direction in which the main flow flows into or through the process chamber. Moreover, such a guide inlet channel for introducing the guide gas flow makes it possible, for example, to adjust further flow properties of the guide gas flow, such as its flow velocity and/or volume flow per volume element it flows through, in particular to a large extent or to a certain extent independently of the main flow. For example, the guide gas flow and the main flow can be adapted to the respective requirements, e.g. the guide gas flow can have a higher volumetric flow rate in order to achieve good directional stability and a long effective distance, while the volumetric flow rate or mass flow rate and/or the flow velocity of the main flow can be selected to be smaller, e.g. to avoid or at least reduce blowing of powder applied in the build area.

Preferably the guide gas flow has at least in a section thereof, in particular directly after entering the process chamber, a maximum velocity which is at least 20% larger and/or a volumetric flow rate per volume element that it flows through which is at least 20% larger than that of the main flow.

When determining the respective volumetric flow rate, the volume element can, for example, be a cube with an edge length of 5 mm or 1 cm. It can be selected in a suitable way directly downstream of an outlet of the channel or of the channels and of the guide inlet channel into the process chamber.

A higher inlet velocity or a larger volumetric flow rate of the guide gas flow can, for example, provide for a longer effective distance and/or a higher directional stability of the guide gas flow. Since the guide gas flow only flows through those regions of the process chamber which are located outside the build area, the flow velocity and/or the volumetric flow rate of the guide gas flow can be selected sufficiently large without risking blowing of the powder applied in the build area.

Preferably the guide gas flow is introduced at an angle larger than 0° away from the direction of the main flow, more preferably at an angle of at least 1°, even more preferably of at least 3°, even more preferably of at least 5° and/or of 30° at most, more preferably of 20° at most, even more preferably of 15° at most.

More preferably, the angle is chosen in such a way that it takes into account or compensates in a forward-looking manner for a deflection of the main flow which deflection occurs in the further course of the main flow and is caused by the secondary flow, so that the secondary flow substantially proceeds along its entire course of the flow in the sub-region of the lower height range located above the bottom surface that surrounds the build area.

This makes it possible, for example, to achieve a particularly good improvement in the homogeneity of the main flow, in particular if the guide gas flow flows substantially parallel to the main flow direction in its further course (after being deflected by the secondary gas flow).

While implementing the influencing measure II, i.e. that flow properties of the secondary flow are modified in a controlled manner at least in a section of the secondary flow, in particular the direction and/or the velocity and/or the volumetric flow rate of the secondary flow, alternatively or in addition to introducing at least one guide gas flow described above, furthermore a secondary gas outlet can be provided in the process chamber in the sub-region of the lower altitude region that is located above a bottom surface of the process chamber surrounding the build area, wherein the secondary flow is at least partially discharged from the process chamber through the secondary gas outlet.

For example, discharging of the secondary flow can be implemented by sucking the secondary flow out. Such a secondary gas outlet or discharging of the secondary flow, for example, provides further possibilities of positioning a boundary zone according to the invention.

When using the influencing measure III that the secondary flow is displaced in a controlled manner at least in a section of the secondary flow by means of introducing a further gas flow into the process chamber into the sub-region of the lower altitude region, which sub-region is located above the bottom surface surrounding the build area, preferably the further gas flow is at least partially directed in an opposite direction to the secondary flow and/or obliquely arrives at the secondary flow and/or has a larger flow velocity and/or a larger volumetric flow rate than the secondary flow.

Thus, for example, a further possibility is provided with which an inventive boundary zone can be generated and/or positioned.

Preferably, in the inventive method for providing a flow for a process chamber described above, the main flow and the secondary flow are simulated in advance using a computer program and a suitable boundary zone or a boundary zone to be expected is determined based on the simulation. This enables, for example, a suitable boundary zone to be determined in advance.

More preferably, the computer program is configured to implement an algorithm for implementing machine learning and/or the boundary zone is determined iteratively. This provides, for example, possibilities for determining a suitable boundary zone in advance.

According to the invention, a method, i.e. a manufacturing method, serves for producing a three-dimensional object in a device for producing a three-dimensional object by layer-wise application and selective solidification of a building material in a build area. In this manufacturing method, at least during the selective solidification of at least one layer of the building material an above-described method of providing a flow for a process chamber, i.e. a flow providing method described above, is carried out.

This makes it possible, for example, to achieve the effects described above in relation to the method of providing a flow for a process chamber also in an additive manufacturing method.

A flow providing device according to the invention serves for providing a flow in a process chamber in a lower altitude region of the process chamber using a process gas, wherein the process chamber is a process chamber of a device for producing a three-dimensional object by layer-wise application and selective solidification of a building material in a build area. The flow providing device comprises a gas supply device for generating at least one gas flow in the process chamber and the process chamber comprises a gas inlet for introducing the process gas into the process chamber and a gas outlet for discharging the process gas from the process chamber, wherein the gas inlet and the gas outlet are provided in the lower altitude region of the process chamber and wherein during operation of the flow providing device the process gas flows in a main flow from the gas inlet to the gas outlet. During operation of the flow providing device, a secondary flow is located in a sub-region of the lower altitude region, which sub-region is located above a bottom surface of the process chamber surrounding the build area, wherein a boundary zone is provided at least in a section between the secondary flow and the main flow at least during the selective solidification of at least one layer of the building material and substantially in that sub-region of the lower altitude region that is located above the bottom surface surrounding the build area. For this purpose, the flow providing device comprises at least one of the following means:

means for positioning at least one guide element as boundary zone in the process chamber, wherein the at least one guide element has at least one guide face for guiding the main flow and/or the secondary flow at least in a section;

means for modifying the flow properties of the secondary flow in a controlled manner and at least in a section thereof, in particular in its direction and/or velocity and/or its volumetric flow rate;

means for displacing, in a controlled manner, the secondary flow at least in a section thereof.

A device according to the invention serves for producing a three-dimensional object by layer-wise application and selective solidification of a building material in a build area in a process chamber. The process chamber comprises a gas inlet for introducing a process gas into the process chamber and a gas outlet for discharging the process gas from the process chamber, wherein the gas inlet and the gas outlet are provided in a lower altitude region of the process chamber. The device comprises a flow providing device described above.

This makes it possible, for example, to also obtain the effects described above with respect to the method of providing a flow in a flow providing device and a manufacturing device.

BRIEF DESCRIPTION OF THE DRAWINGS

Further features and expediencies of the invention are set out in the description of exemplary embodiments with the aid of the attached figures.

DETAILED DESCRIPTION OF THE EMBODIMENTS

Figure 1:
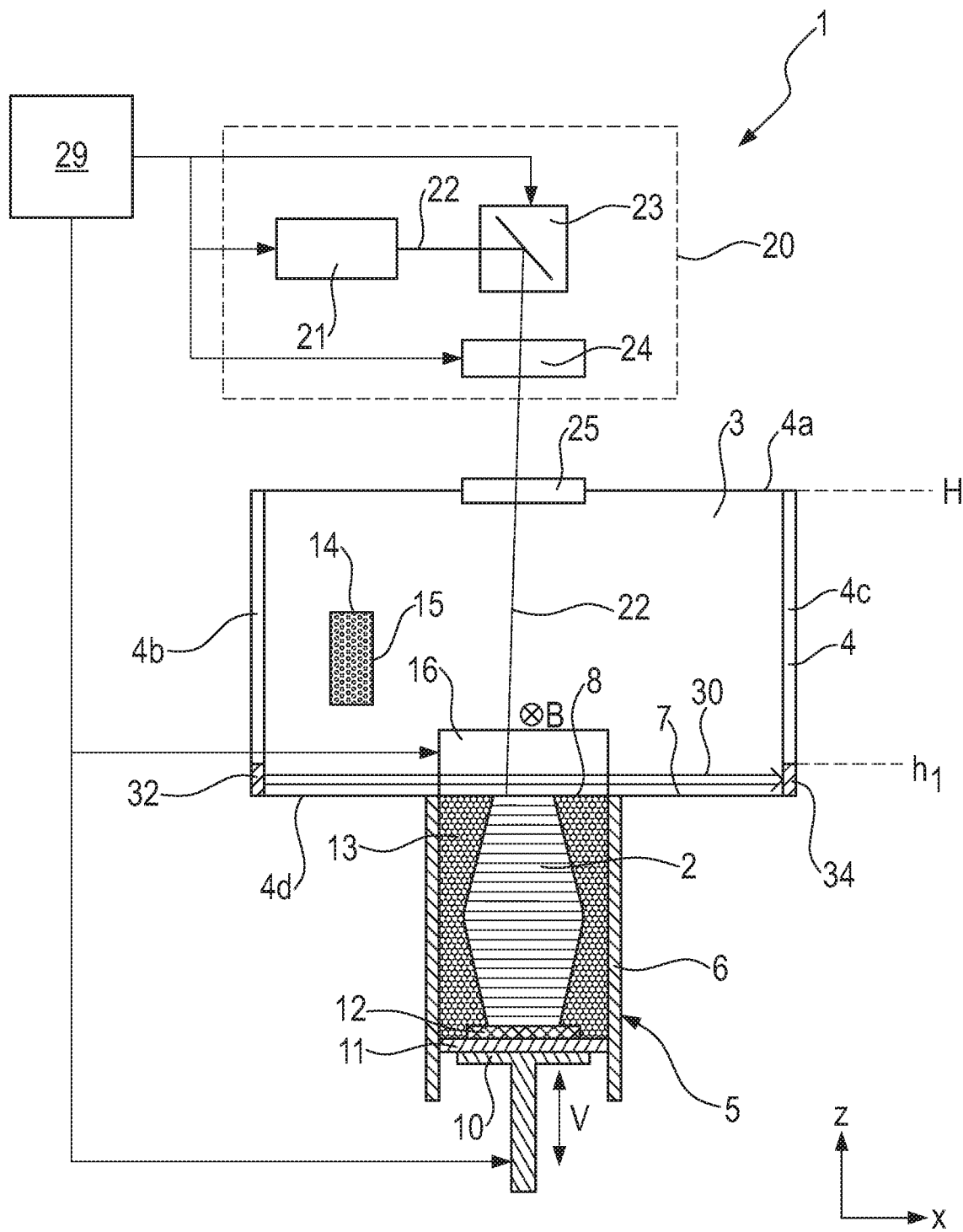
FIG. 1 shows a schematic view, partially in cross-section, of an embodiment of a device for additively producing a three-dimensional object in accordance with the present invention.

Hereafter, an exemplary embodiment of the present invention is described with reference to FIG. 1. The device shown in FIG. 1 is a laser sintering or laser melting device 1 as a device for producing a three-dimensional object. For building an object 2, it comprises a process chamber 3 with a process chamber wall 4.

Below the process chamber 3 a container 5 is arranged that is open to the top and has a container wall 6. In the container 5, also referred to as building container, a support 10 is arranged that can be moved in a vertical direction V and to which a base plate 11 is attached which seals the container 5 to the bottom and thus forms the bottom thereof. The base plate 11 can be formed as a plate separately from the support 10 which plate is fixed to the support 10, or it can be integrally formed with the support 10. Depending on the powder and process used, a building platform 12 can also be arranged on the base plate 11 on which the object 2 is built. However, the object 2 can also be built on the base plate 11 itself, which then serves as a building platform.

A working plane 7 is defined by the upper opening of the container 5, wherein the area of the working plane 7 located within the opening which can be used for building the object 2 is referred to as build area 8. The working plane 7 is also the surface of a bottom 4d of the process chamber 3 that faces the interior of the process chamber 3, i.e. the upper surface. In the exemplary embodiment shown in FIG. 1, the process chamber bottom 4d surrounds the container 5 on all sides thereof at least in the working plane 7. The process chamber bottom 4d and thus the working plane 7 are spaced by a process chamber height H from a ceiling 4a of the process chamber wall 4. The process chamber height H is also referred to as maximum clear height of the process chamber 3, since a ceiling region of the process chamber can have a non-uniform height level, e.g. with roof slopes. The process chamber height H is determined by drawing a perpendicular to the working plane 7 or the build area 8. The extension direction of the perpendicular is also referred to as the z-direction in the following.

In FIG. 1, the object 2 to be formed in the container 5 on the building platform 12 is shown below the working plane 7 in an intermediate state with several selectively solidified layers, surrounded by building material 13 that remained unsolidified.

In a first side 4b of the chamber wall 4 a gas inlet 32 is provided for introducing a process gas into the process chamber 3, which gas inlet is described in more detail below with respect to FIGS. 2-5b. In a second side 4c of the chamber wall 4, which second side is arranged opposite to the first side 4b, a gas outlet 34 is provided for discharging the process gas from the process chamber 3 which gas outlet is preferably designed as an opening in the chamber wall 4. The gas inlet 32 and the gas outlet 34 are thus spaced apart in an x-direction (e.g. shown in FIGS. 3a and 3b). In the process chamber shown in FIG. 1 the sides 4b, 4c of the process chamber wall 4 are arranged perpendicular to the build area 8 and to the working plane 7.

The gas inlet 32 and the gas outlet 34 are each substantially arranged in a lower altitude region of the process chamber 3, wherein the lower altitude region extends from the working plane 7 to a first height $h_1$ of the side 4b and 4c of the chamber wall 4 above the working plane 7. For example, the gas inlet 32 and the gas outlet 34 can extend over approximately 10% or 20% of the process chamber height H. Thus, with respect to the process chamber height H, the gas inlet 32 and the gas outlet 34 are arranged in a region adjacent to the build area 8.

The gas inlet 32 and the gas outlet 34 are connected to a gas supply device that is not shown. They do not need to be adjacent to the working plane 7 as shown in FIG. 1 but can also be at a distance from the working plane. Furthermore, they do not need to be provided in the chamber wall 4, for example they can also be separated from the chamber wall 4 and e.g. project into the interior of the process chamber or be set back from the process chamber wall. Preferably, however, the gas inlet 32 and the gas outlet 34 are flush with the side of the process chamber wall 4b or 4c that faces the inside of the process chamber 3. Furthermore, further gas inlets and/or gas outlets not shown in FIG. 1 can be provided in the process chamber 3, in particular in an altitude region above the lower altitude region, i.e. in an upper altitude region extending between the first height $h_1$ and the process chamber height H.

The laser sintering device 1 further comprises a storage container 14 for a building material 13 in powder form which can be solidified by electromagnetic radiation and a recoater 16 which can be moved in a horizontal direction B (also referred to as recoating direction) for applying the building material 13 within the build area 8. In the device 1 shown in FIG. 1 the recoating direction B runs into the drawing plane (marked by a circle with a cross), which defines a y-direction, but it can also run out of the drawing plane. Preferably the recoater 16 is provided in the device 1 to be movable in two opposite directions.

Preferably, the recoater 16 extends transverse to its direction of movement across the entire area to be recoated. Normally, the recoater 16 thus covers at least one side length or one diameter of the build area 8. The storage container 14 is only shown schematically. In particular, it can be positioned so that it is located above the recoater 16 at the starting position of the recoater. According to an embodiment, also two storage containers can be provided at the starting position and end position of the recoater travel path, respectively. Alternatively, a number of storage containers can also be provided which are located below the working plane 7 and deliver portions of the building material 13 to the recoater 16 by means of a metering piston.

Optionally, a radiant heater not shown in FIG. 1 is arranged in the process chamber 3 or in the process chamber ceiling 4a, which radiant heater serves for heating the applied building material 13. For example, an infrared radiator can be provided as the radiant heater.

Preferably, the direction in which the gas inlet 32 and the gas outlet 34 are spaced apart (x-direction), the movement direction of the recoater 16 (y-direction) and the process chamber height H (z-direction) define a Cartesian coordinate system.

The laser sintering device 1 further comprises as an irradiation device an exposure device 20 with a laser 21 which produces a laser beam 22 which is deflected by a deflection device 23 and focused upon the working plane 7 by way of a focusing device 24 through a coupling window 25 which is arranged on the upper side of the process chamber 3 in the chamber wall 4, i.e. in the ceiling 4a of the chamber wall 4. FIG. 1 shows a process chamber 3 with one coupling window 25, however it is also possible to provide several coupling windows in the chamber wall 4 or in the process chamber ceiling 4a.

Furthermore, the laser sintering device 1 comprises a control unit 29 by which the individual components of the device 1 can be controlled in a coordinated manner in order to implement the building process. Alternatively, the control unit can also be arranged partially or completely outside the device. The control unit can comprise a CPU, the operation of which is controlled by a computer program (software). The computer program can be stored separately from the device on a storage medium from which it can be loaded into the device, in particular into the control unit.

During operation of the laser sintering or laser melting device 1, in order to apply a layer of the building material in powder form 13, the support 10 is first lowered by an amount which corresponds to the desired layer thickness. The recoater 16 receives from the storage container 14 an amount of building material 13 sufficient for the application of a layer and then moves across the build area 8, there applies the building material 13 to the building platform or to a powder layer already present and spreads it into a layer. Optionally, the building material 13 is heated by means of a radiant heater (not shown in the figures) to a working temperature.

The cross-section of the object 2 to be produced is then scanned by the laser beam 22 so that the building material in powder form 13 is solidified at these positions that correspond to the cross-section of the object 2 to be produced. These steps are repeated until the object 2 is completed and can be removed from the process chamber 3.

According to the invention, during the production of the three-dimensional object 2, however at least during the selective solidification of the building material layers, a gas (process gas) is supplied to the process chamber 3 by the gas supply device that is not shown, e.g. in order to remove atmospheric impurities from the process chamber 3 that arise during the selective solidification of metal or metal-based (metal content greater than 50 volume percent) building material. By doing so, the gas first flows through the gas inlet 32 into the process chamber 3. Then it flows substantially as a free jet within the cavity of the process chamber 3. A main flow 30 of the process gas flowing in through the gas inlet 32 runs substantially in the y-direction from the gas inlet 32 to the gas outlet 34. The process gas is discharged from the process chamber 3 through the gas outlet 34, taking with it any impurities.

Preferably a protective gas is used as the gas or process gas which substantially does not react chemically with the building material (inert gas), for example nitrogen or argon, depending on the building material used.

Various types of powders can be used as the building material, in particular metal powders, plastic powders, ceramic powders, sand, filled or mixed powders. Instead of a powder, other suitable materials can also be used as the building material. Preferably the building material is a metal powder. When a metal powder is used as a building material, the occurrence of impurities such as splashes, fumes, smokes, vapors and/or gases is particularly high so that particularly good improvements in the manufacturing process or the quality and/or dimensional accuracy of the object to be produced can be achieved by the invention.

Figure 2:
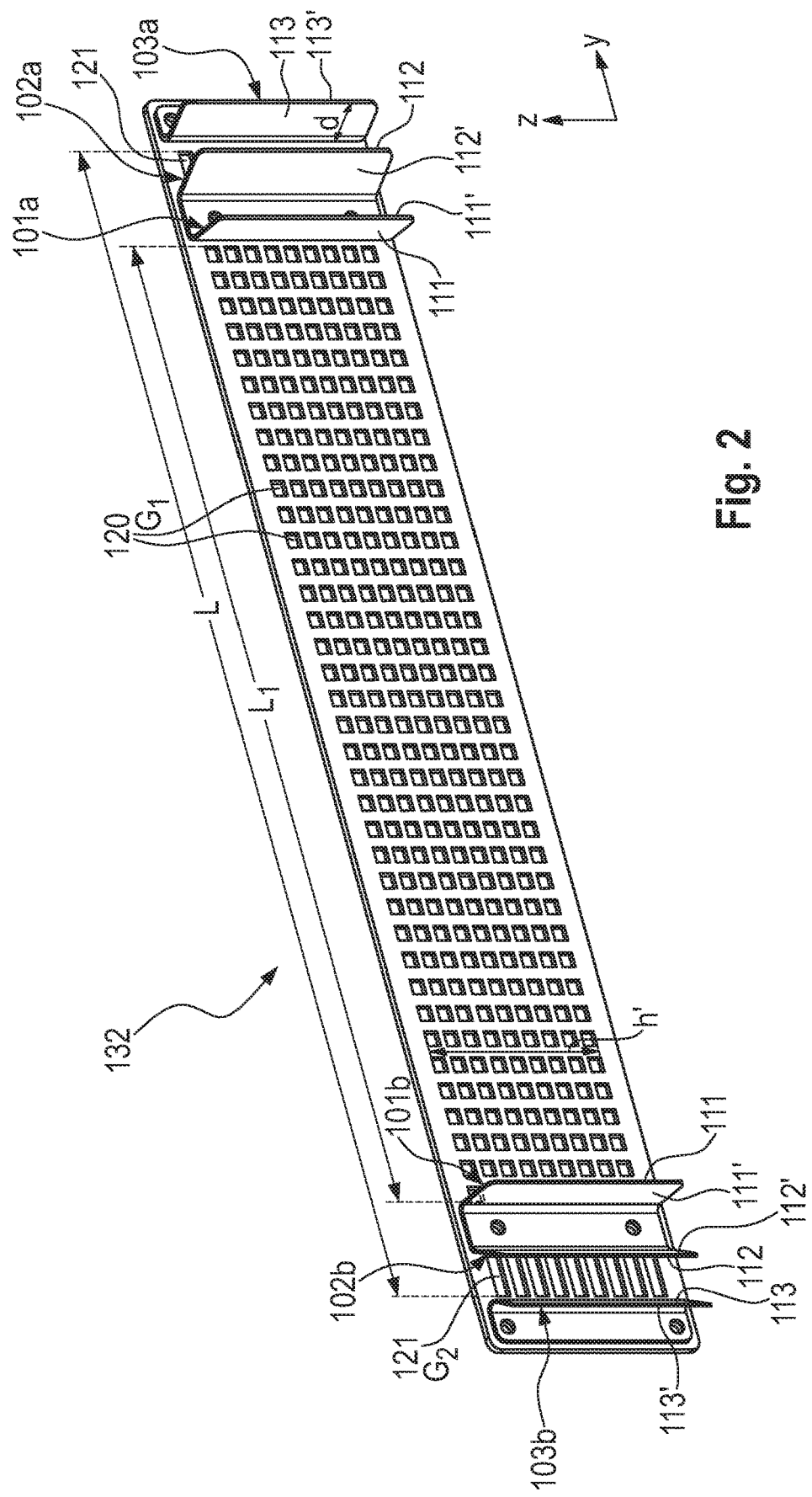
FIG. 2 shows a schematic view of a gas inlet element according to a first embodiment of the present invention for use in a gas inlet shown in FIG. 1.

FIG. 2 shows a perforated plate 132, also referred to as a gas inlet field, for use in the gas inlet 32 shown in FIG. 1. The perforated plate 132 has a plurality of spaced apart main gas inlet openings 120 and a plurality of spaced apart guide gas inlet openings 121 for introducing a gas into the process chamber 3, wherein the main gas inlet openings and the guide gas inlet openings are provided in different areas of the perforated plate as described below.

The perforated plate 132 as a gas introducing element can be attached to the process chamber wall 4b or is attached to the process chamber wall 4b during operation such that the main gas inlet openings 120 and the guide gas inlet openings 121 substantially form the only gas-permeable openings of the gas inlet 32 of FIG. 1 for introducing the gas into the process chamber 3. However, the process chamber 3 can include further gas inlets e.g. at an upper altitude region of the process chamber 3 in addition to the gas inlet 32.

Preferably, the main gas inlet openings 120 are arranged in a grid pattern in the perforated plate 132, i.e. they are arranged regularly spaced apart next to each other and one below the other in rows and columns. The rows and/or columns can also be shifted relative to each other (not shown in FIG. 2). A row of main gas inlet openings 120 extends substantially over a length $L_1$ in the y-direction and a column of main gas inlet openings 120 extends substantially over a height h' in the z-direction when the perforated plate 132 is attached in the side wall 4b of the process chamber 3. During operation, the height h' preferably corresponds approximately to the first height $h_1$ up to which the lower altitude region of the process chamber 3 extends. As shown in FIG. 2, the main gas inlet openings 120, for example, can be formed as substantially square holes in the perforated plate 132. The main gas inlet openings 120 preferably each have a channel cross-section with a defined area $G_1$.

At the side of the main gas inlet openings 120 in relation to the y-direction, one column of regularly spaced apart guide gas inlet openings 121 is provided in the perforated plate 132, respectively. More than one column of guide gas inlet openings 121 can also be provided, respectively. A column of guide gas inlet openings 121 substantially extends over a height h' in the z-direction when the perforated plate 132 is attached in the side wall 4b of the process chamber 3. During operation, the height h' preferably corresponds approximately to the first height $h_1$ up to which the lower altitude region of the process chamber extends. The main gas inlet openings 120 and the guide gas inlet openings 121 are altogether arranged in the perforated plate 132 substantially over a length L in the y-direction when the perforated plate 132 is attached in the side wall 4b of the process chamber 3.

As shown in FIG. 2, the guide gas inlet openings 121 can be formed as e.g. substantially rectangular holes or slits in the perforated plate 132, wherein preferably the longer side of the rectangle (the longitudinal direction of the slit) is arranged in the y-direction. The guide gas inlet openings 121 preferably have a defined area $G_2$ each. Preferably the area $G_2$ of the guide gas inlet openings 121 is larger than the area $G_1$ of the main gas inlet openings 120.

Principally, the shape of the main gas inlet openings 120 and of the guide gas inlet openings 121 is not limited to a square or rectangular cross-section, the main gas inlet openings 120 and the guide gas inlet openings 121 can have any cross-section, for example they can also be shaped as circular or triangular holes. Preferably, the main gas inlet openings 120 each have substantially the same shape and/or are of equal size and/or the guide gas inlet openings 121 each have substantially the same shape and/or are of equal size. The guide gas inlet openings 121 are preferably larger than the main gas inlet openings 120.

Figure 3A:
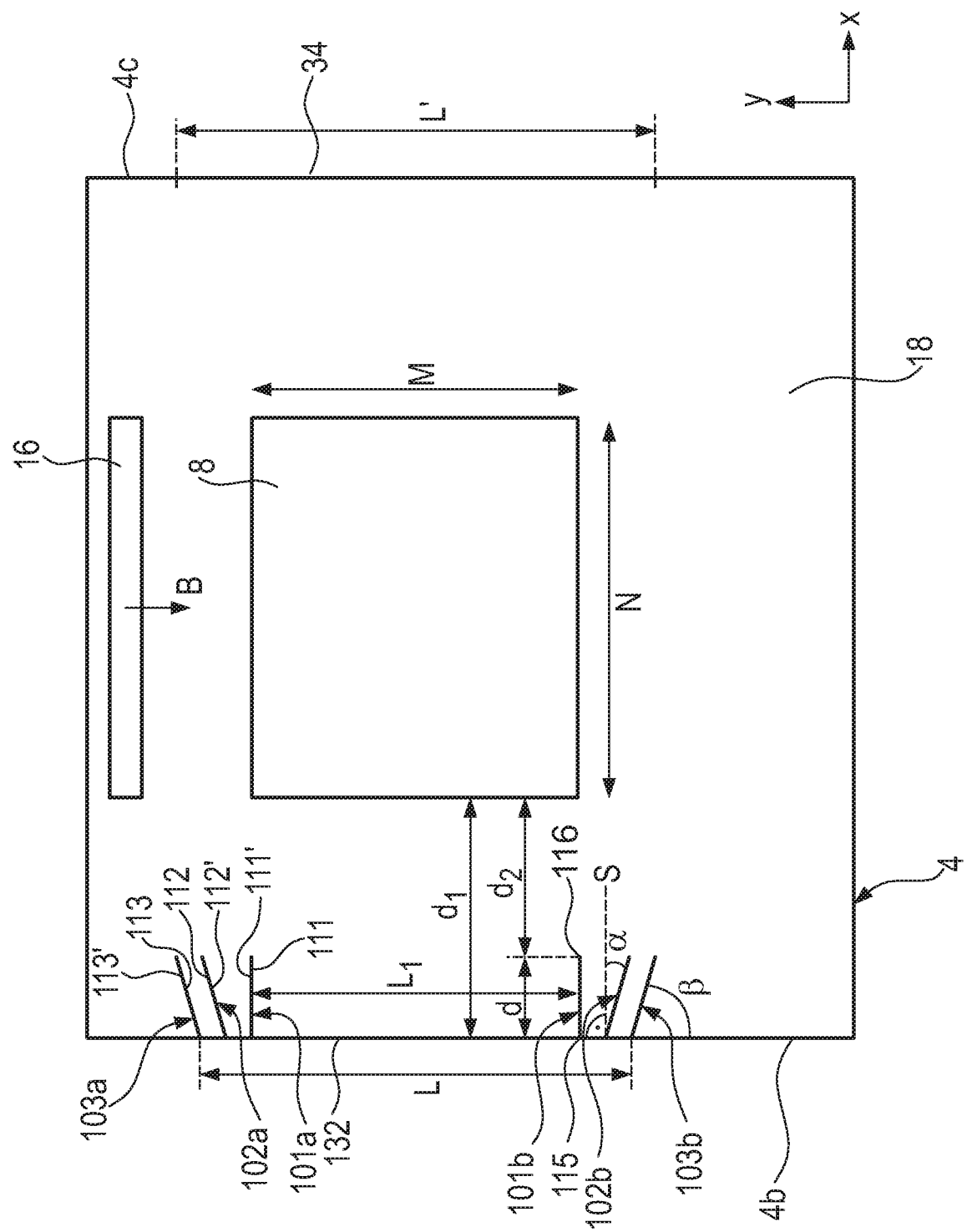
FIG. 3a shows a schematic view in cross-section of a section of a process chamber of the device shown in FIG. 1 in a view of the build area from above, using the gas inlet element shown in FIG. 2.

Furthermore, six guide elements 101a, 101b, 102a, 102b, 103a, 103b are arranged at the perforated plate 132. The guide elements can, for example, be designed as plates screwed or riveted to the perforated plate. The guide elements 101a, 101b, 102a, 102b, 103a, 103b are preferably provided at the perforated plate without gaps so that during operation they guide adjacent partial gas flows at least at one side immediately after the adjacent partial gas flows enter the process chamber. Each guide element has a height extent in the z-direction which preferably corresponds to at least the height h' of a column of main gas inlet openings 120 or guide gas inlet openings 121. In addition, each guide element extends in a second direction perpendicular to its height extent by a length d between a first end 115 provided at the perforated plate and a second end 116 (see FIG. 3a, shown there only for the guide element 101b). In the third spatial direction perpendicular to the second direction and to the height extent, the guide elements have a thickness which is several times smaller than each of the height extent and the length d. The thickness of the guide elements 101a, 101b, 102a, 102b, 103a, 103b, for example, can be 0.5 mm, 1 mm or a few millimeters. The guide elements 101a, 101b, 102*a*, 102*b* each have a flat guide face 111, 112 as well as a further flat face 111', 112' at their opposite side. Both guide elements 103*a*, 103*b* are substantially composed of two plane, i.e. flat, guide faces 113, 113' which are pairwise parallel to each other.

The guide elements 101*a* and 101*b* are arranged on both sides of a rectangular field comprising the main gas inlet openings 120. They are arranged at the perforated plate 132 substantially directly adjacent to the main gas inlet openings in the y-direction in such a way that their guide faces 111 each face the main flow 30 that flows through the main gas inlet openings 120 into the process chamber 3 during operation of the gas supply device (not shown). As described above, the further faces 111' are each provided on the side of the guide element 101*a*, 101*b* facing away from the main flow 30 (see also FIG. 3*a*). The faces 111' have no direct flow-leading or flow-guiding function, as they are each located facing away from the main flow 30 introduced into the process chamber and from other directed process gas flows. The guide elements 101*a*, 101*b* are arranged at the perforated plate 132 in such a way that their guide faces 111 are arranged substantially perpendicular to the opening areas of the main gas inlet openings 120 or to the in this case uniform opening plane of the gas inlet. They are thus arranged parallel to a main flow direction in which the main flow 30 flows through the main gas inlet openings 120 into the process chamber during operation of the (not shown) gas supply device (see also FIG. 3*a*).

The other guide elements 102*a*, 102*b*, 103*a*, 103*b* are each arranged at the perforated plate 132 in pairs on the sides of the guide gas inlet openings 121. Their guide faces 112, 113 each face a guide gas flow 35, 36 (see FIG. 3*b*) flowing through the guide gas inlet openings 121 into the process chamber during operation of the gas supply device (not shown). Further faces 112' and guide faces 113' are each provided on the side of the guide element 101*a*, 101*b* facing away from the guide gas flows 35, 36 (see also FIG. 3*a*). The faces 112' have no direct flow-leading or flow-guiding function, as they are each located facing away from the main flow 30 introduced into the process chamber and from the guide gas flows 35, 36. The guide elements 102*a*, 102*b*, 103*a*, 103*b* are arranged at the perforated plate 132 in such a way that their guide faces 112, 113, 112', 113' are at a uniform angle to a perpendicular S to an opening area of the guide gas inlet openings 121 (see also FIG. 3*a*).

Preferably, the perforated plate 132 is thus axially symmetrical with respect to a central axis extending in the z-direction.

Thus the guide elements 101*a*, 101*b* flank the field of the main gas inlet openings 120 having the length $L_1$ and/or at least a section of the main flow 30 that flows through the main gas inlet openings 120 into the process chamber during operation of the gas supply device (not shown) at least over the height h'. Likewise, the guide elements 102*a*, 102*b*, 103*a*, 103*b* flank two fields of the guide gas inlet openings 121 and/or at least a section of the guide gas flows 35, 36 (see FIG. 3*b*) that flow through the guide gas inlet openings 121 into the process chamber during operation of the gas supply device (not shown) at least over the height h'.

FIG. 3*a* shows a schematic view of the surface 18 of the process chamber bottom 4*d* and the build area 8 from above. The build area is preferably rectangular and has a length N (in x-direction) and a width M (in y-direction). The recoater 16 is arranged in FIG. 3*a* in a rest position outside the build area 8 and can be moved in the recoating direction B (in y-direction) across the width M of the build area. In the view from above, the perforated plate 132 is arranged along a first side of the build area 8 and runs parallel to it. The gas outlet 34 is arranged along a second side of the build area 8 opposite the first side and is also parallel to the second side. The gas inlet or perforated plate 132 and the gas outlet 34 extend substantially along the width M of the build area 8 (i.e. in the y-direction), wherein along the width M of the build area 8, i.e. in the horizontal direction (parallel to the working plane 7), the length $L_1$ of the perforated plate 132 and a length L' of the gas outlet 34 are at least as large, preferably larger than, the width M of build area 8.

As shown in FIG. 3*a*, the perforated plate 132 and the gas outlet 34 extend along the width M of the build area 8, i.e. in the y-direction, not over the entire extent of the process chamber 3 and are thus spaced from the process chamber wall 4.

Furthermore, the view from above shown in FIG. 3*a* also shows the guide elements 101*a*, 101*b*, 102*a*, 102*b*, 103*a*, 103*b* arranged at the perforated plate. Since they have only a small thickness as described above, they are depicted as lines in the view from above in FIG. 3*a*. They each extend from the first end 115 attached to the perforated plate 132 in the direction of the build area (i.e. in the x-direction) up to the second end 116, wherein for reasons of clarity, the ends 115, 116 are only shown for the guide element 101*b*. The first end 115 is arranged at a first distance $d_1$ from the build area and the second end 116 is arranged at a second distance $d_2$ from the build area, wherein the first distance $d_1$ is greater, for example by 10 cm, than the second distance $d_2$.

As can best be seen from FIG. 3*a*, the guide elements 102*a*, 102*b*, 103*a*, 103*b* provided at the guide gas inlet openings 121 are arranged at the perforated plate 132 in such a way that their guide faces 112, 113, 112', 113' are each arranged at an angle $\alpha$ ($\alpha>0$'; for example $\alpha=10°$ or $\alpha=15°$) to the perpendicular S that is perpendicular to an opening area of the guide gas inlet openings 121 and accordingly arranged at an angle $\beta=90°-\alpha$ to the side wall 4*b* of the process chamber 3.

Figure 3B:
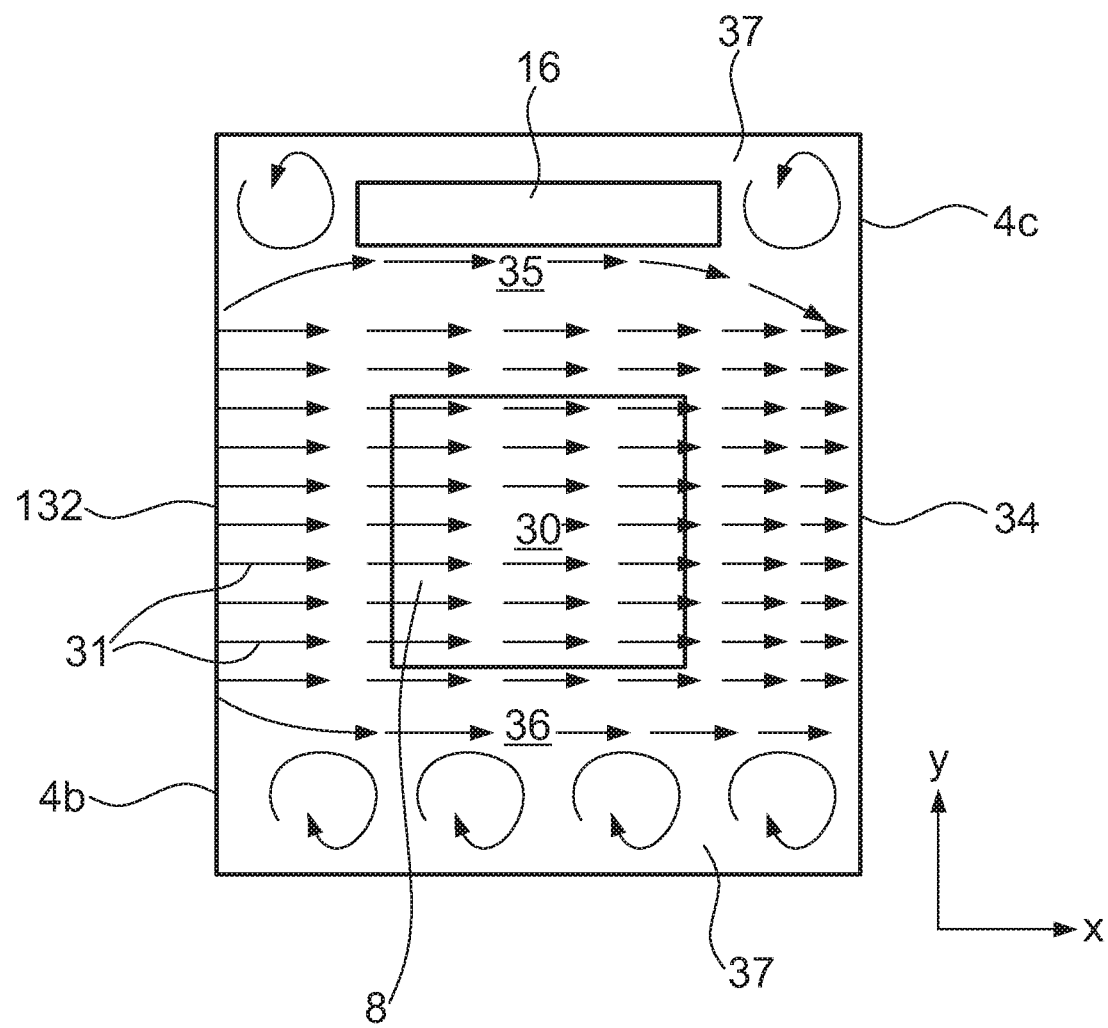
FIG. 3b shows a schematic example of gas flows during operation of a gas supply device provided in the device.

FIG. 3*b* shows an example of gas flows generated in the process chamber 3 during operation of the gas supply device in the view from above of FIG. 3*a*. The gas flows are exemplarily depicted in a sectional plane parallel to the build area (x-y plane), which sectional plane is located in the lower altitude region of the process chamber. For reasons of clarity, the guide elements shown in FIG. 3*a* are not shown in FIG. 3*b*. Moreover, only a few of the partial gas inlet flows 31 (see below) are shown as an example and not all of them.

The partial gas inlet flows 31 flowing through the main gas inlet openings 120 of the perforated plate 132 into the process chamber 3 form a main flow 30 that flows through the process chamber 3 substantially in a single main flow direction from the gas inlet 132 or 32 to the gas outlet 34, i.e. in the x-direction, and thus flows across the build area 8. Perpendicular to the build area 8 and to the working plane 7, i.e. in the z-direction, the main flow 30 extends substantially over the lower altitude region of the process chamber 3 (not shown in FIG. 3*b*), e.g. over a lower third of the process chamber height H. In the course of this, at least a section of the main flow 30 is guided and shielded by the guide elements 101*a*, 101*b*, i.e. laterally (in y-direction) and over the length d between the first end 115 and the second end 116 of the guide elements (in x-direction). In particular, the guide faces 111 facing the main flow 30 ensure that the main flow 30 is guided, i.e. they prevent the main flow from spreading and/or diverting in the y-direction. In particular the guide faces 111' facing away from the main flow 30 ensure shielding of the main flow 30 against a potentially occurring disturbance flow or secondary flow (see below) in the area between the guide faces 111' and 112' in which no flow is specifically generated. In other words, the guide faces 111' keep such a disturbance or secondary flow away from the main flow 30 at least in a section thereof and allow the main flow to flow there substantially unimpeded. Thus, the guide elements 101*a*, 101*b* form a boundary zone according to the present invention.

Analogously, the partial gas inlet flows (not shown in FIG. 3*a*) flowing in through the guide gas inlet openings 121 form two guide gas flows 35, 36 at the sides of the main flow 30. Due to the inclination of the guide elements 102*a*, 102*b*, 103*a*, 103*b* and their guide faces 112, 113, 112', 113' with respect to the perpendicular S that is perpendicular to the opening area of the guide gas inlet openings 121 (angle α), the guide gas flows 35, 36 flow substantially at the angle α from the guide gas inlet openings 121 into the process chamber 3. In the preferred case that the area $G_2$ of the guide gas inlet openings 121 is each greater than the area $G_1$ of the main gas inlet openings 120, the volumetric flow rate of the guide gas flows 35, 36 exiting the guide gas inlet openings 121 per each opening is greater than the volumetric flow rate of the main flow 30 exiting the main gas inlet openings 120. The guide faces 112, 113 facing the guide gas flows 35, 36 form at least in a section a flow channel (that is open to the top and to the bottom, i.e. in the z-direction) for guiding the guide gas flows 35, 36 in at least a section. The guide faces 113' facing away from the guide gas flows 35, 36 also serve to guide the guide gas flows 35, 36 by shielding them from a disturbance or secondary flow (see below). Thus, the guide elements 103*a*, 103*b* also form a boundary zone according to the present invention.

Furthermore, FIG. 3*b* shows further regions of the lower altitude region in which a disturbance flow or secondary flow 37 described above can form, which further regions are located laterally (in the y-direction) of the region through which the main flow 30 and the guide gas flows 35, 36 flow. The disturbance or secondary flow 37 can in particular be an undirected, turbulent gas flow and is therefore depicted in FIG. 3*b* by turbulences, i.e. circular arrows. The angle α at which the guide gas flows 35, 36 enter the process chamber 3 takes into account or anticipates a common influence on the guide gas flows 35, 36 by the disturbance or secondary flow 37, e.g. determined in tests, in such a way that the guide gas flows 35, 36 flow substantially parallel to the main flow, i.e. substantially along the main flow direction, in their further course of flow. At the same time, they flow alongside the main flow 30 and/or in a region outside the build area 8 so that they flank at least a section of the main flow 30 in the y-direction. Thus, the guide gas flows 35, 36 also provide at least sectional guidance or shielding of the main flow 30 and form a boundary zone according to the present invention.

The guide elements 101*a*, 101*b*, 102*a*, 102*b*, 103*a*, 103*b* of the perforated plate 132 shown in FIGS. 2 and 3*a* are all identical, regardless of their orientation in space. However, they can at least partly also be formed differently, in particular have different dimensions in at least one direction. They can also have a non-insignificant thickness extent; for example, the guide elements 101*a*, 102*a* or 101*b*, 102*b* provided between the main flow 30 and the guide gas flows 35, 36 can each be formed integrally as a single guide element with the guide face 112 facing the guide gas flow 35 or 36 and the guide face 111 facing the main flow 30, respectively. The embodiment shown in FIG. 2, on the other hand, provides for the advantages of structural simplicity and cost-effective production and is particularly easy to maintain, since its very small horizontal area extent prevents deposits of particles on its upper side or keeps them as small as possible.

The guide elements can also deviate from the shape shown in the figures, for example the guide faces do not need to be flat, i.e. plane faces, but the guide elements can also have curved faces, for example.

With regard to FIGS. 2, 3*a* and 3*b*, three measures are described above to improve the flow properties of the main flow 30 and the guide gas flows 35, 36, however, not all three of the measures described need to be implemented. For example, the perforated plate 132 can only be provided with the main gas inlet openings 120 and with the guide elements 101*a*, 101*b* which flank these openings or the main flow 30 generated during operation of the gas supply device in at least a section, i.e. without the guide gas inlet openings 121 and the guide elements 102*a*, *b*, 103*a*, *b*. The perforated plate 132 can, for example, also be provided without the guide gas inlet openings 121, i.e. the guide gas inlet openings are formed identical to the main inlet openings 120. The perforated plate 132 can also be provided without the guide elements 101*a*, 101*b* flanking the main gas inlet openings 120, for example. The guide elements 101*a*, *b*, 102*a*, *b*, 103*a*, *b* and/or the guide gas inlet openings 121 do not need to be provided on both sides of the perforated plate 132, in particular symmetrically. For example, the guide elements 101*a*, 101*b*, 102*a*, 102*b*, 103*a*, 103*b* and/or the guide gas inlet openings 121 can at least partially be provided only at one end (in relation to the y-direction) of the perforated plate 132.

A common gas supply or separate gas supplies can be provided for the main gas inlet openings 120 and the guide gas inlet openings 121 of the perforated plate 132.

Figure 4:
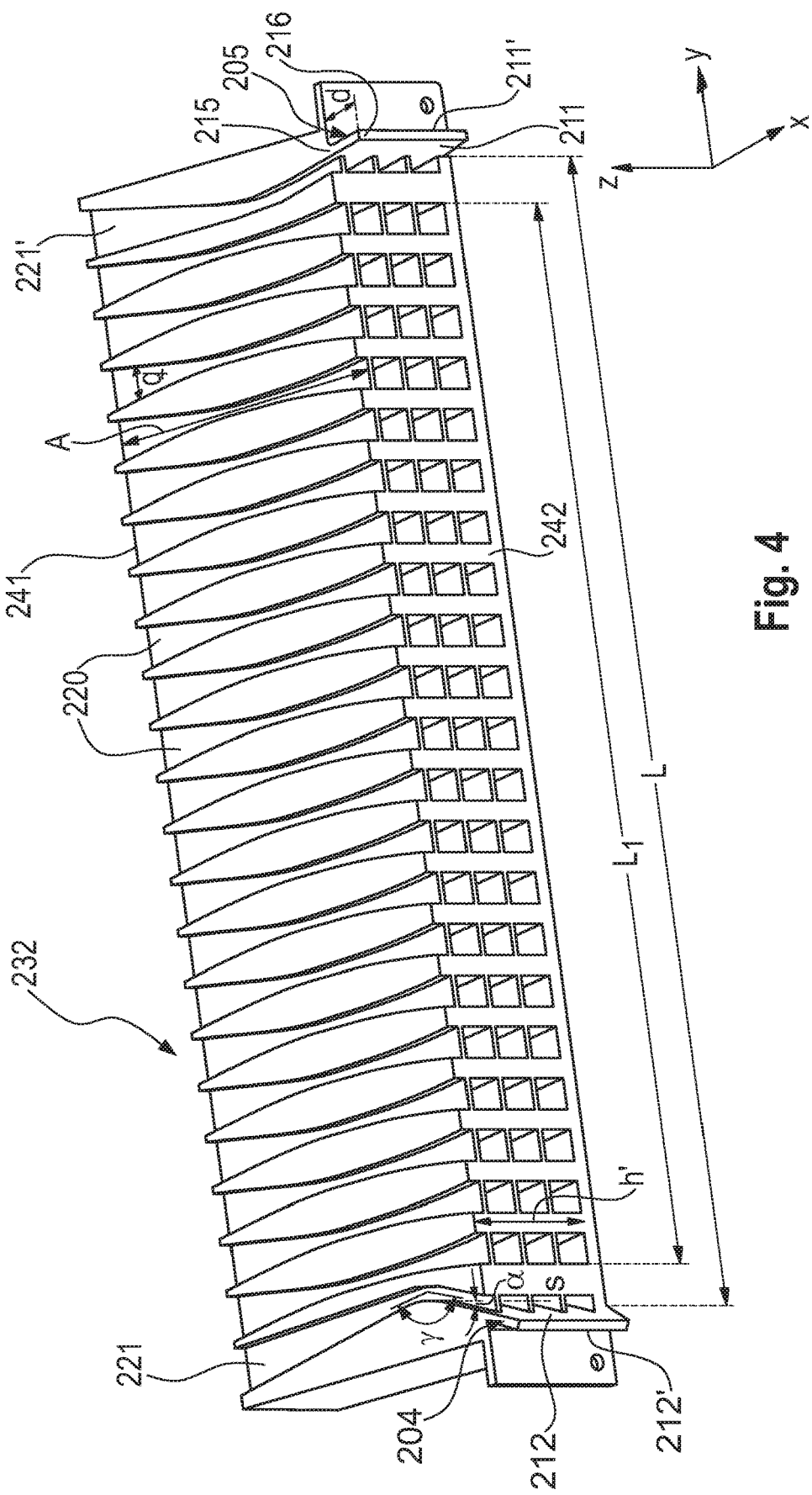
FIG. 4 shows a schematic view of a gas inlet element according to a second embodiment of the invention for use in a gas inlet shown in FIG. 1.

FIG. 4 shows a nozzle element 232 for use in the gas inlet 32 shown in FIG. 1. To better illustrate the nozzle element 232 it is shown in a view in cross-section, i.e. the top row of the gas inlet channels 220, 221 (see below) is shown in a cross-sectional view to enable depiction of the interior of the gas inlet channels.

The nozzle element 232 differs from the perforated plate 132 described with reference to FIGS. 2, 3*a* and 3*b* substantially in that it comprises gas inlet channels 220, 221 instead of gas inlet openings 120, 121 (see FIG. 2) for introducing the process gas into the process chamber 3, i.e. it is shaped significantly more three-dimensional in this respect.

The nozzle element 232 is formed of a body of a solid material which is penetrated from a gas inlet side 241 to a gas outlet side 242 by a plurality of gas inlet channels 220, 221, 221'. The gas inlet channels 220, 221, 221' are bounded on all sides by walls and form the only gas-permeable connection from the gas inlet side 241 through the nozzle element 232 to the gas outlet side 242 in a gas supply line (not shown) to the process chamber 3 of the additive manufacturing device 1 in operation of the nozzle element 232. The gas inlet channels 220, 221, 221' extend in an extension direction over a distance A, wherein the extension direction of the gas inlet channels 220, 221, 221' corresponds to the flow direction of the gas through the nozzle element 232 from the gas inlet side 241 to the gas outlet side 242, i.e. the x-direction.

Preferably, the gas inlet channels 220, 221, 221' are arranged in rows and columns in the nozzle element 232, next to and regularly spaced from each other in relation to the y-z plane, as shown in FIG. 4. In the mounted state of the nozzle element 232, the rows of gas inlet channels are preferably arranged parallel to the build area 8. The rows and/or columns can also be shifted relative to each other (not shown in FIG. 4).

The nozzle element 232 has a plurality of main gas inlet channels 220 and a plurality of guide gas inlet channels 221, 221', wherein the guide gas inlet channels 221, 221' in FIG. 4 are provided as a column of gas inlet channels with respect to the y-direction beside the main gas inlet channels 220 each. More than one column of guide gas inlet channels 221, 221' can also be provided each.

Analogous to a row of main gas inlet openings 120 of the perforated plate 132 shown in FIG. 2, a row of the main gas inlet channels 220 extends substantially over a length $L_1$ in the y-direction and a column of the main gas inlet channels 220 extends substantially over a height h' in the z-direction when the nozzle element 232 is arranged during its use at the side wall 4b of the process chamber 3 or in an opening region of the gas supply line (not shown) to the process chamber 3. The height h' preferably corresponds approximately to the first height $h_1$ (see FIG. 1) up to which the lower altitude region of the process chamber 3 extends.

A column of the guide gas inlet channels 221, 221' also extends substantially over a height h' in the z direction when the nozzle element 232 is arranged at the side wall 4b of the process chamber 3, wherein the height h' preferably corresponds to the first height $h_1$ (see FIG. 1) up to which the lower altitude region of the process chamber 3 extends. The main gas inlet channels 220 and the guide gas inlet channels 221, 221' are altogether arranged substantially over a length L in the y-direction in the nozzle element 232.

Figure 5:
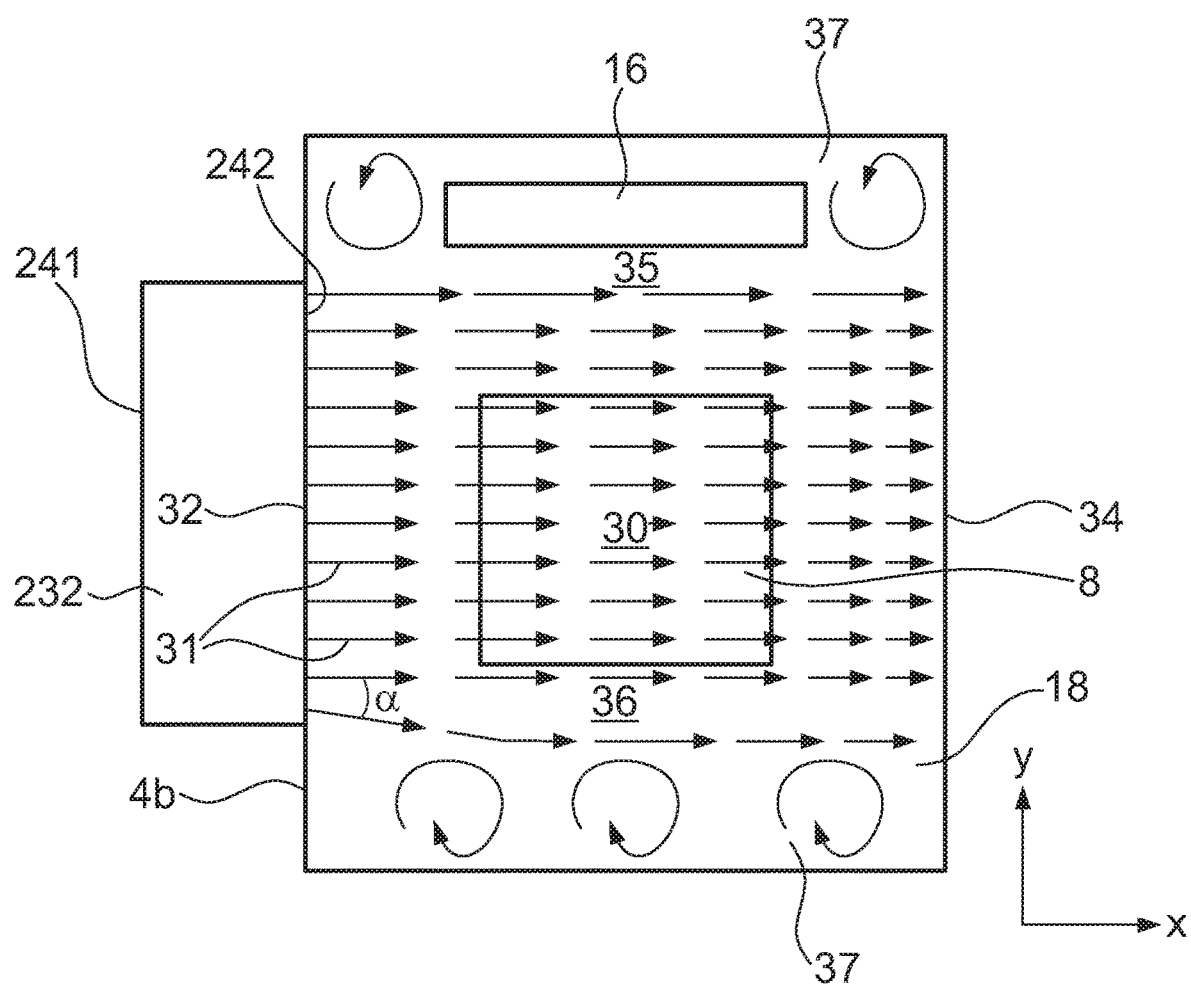
FIG. 5 shows a schematic view in cross-section of a section of a process chamber of the device shown in FIG. 1 in a view of the build area from above, using the gas inlet element shown in FIG. 4, wherein FIG. 5 further exemplarily and schematically shows gas flows generated during operation of a gas supply device provided in the device.

Preferably at least the length $L_1$ of the nozzle element 232, more preferably the length L' of the nozzle element 232, along a width M of the build area 8, i.e. in the horizontal direction (parallel to the working plane 7), is at least as large as, preferably larger than, the width M of the build area 8 (see FIG. 5 in conjunction with FIG. 3a).

The nozzle element 232 has a basic body shaped as a rectangular cuboid, which during operation fits flush into a gas supply channel of an additive manufacturing device with the gas supply channel cross-section having a rectangular cuboid shape at least in its end region. On its front side, which is closer to the viewer in FIG. 4, it has a flange on each side for attachment of the nozzle element 232, e.g. to the process chamber wall 4. A bounding box around the cavities of the main gas inlet channels 220 corresponds to a rectangular cuboid with slightly smaller dimensions than the base body. Accordingly, the gas flow formed by the battery of main gas inlet channels 220 has a substantially rectangular cross-section at least immediately after its exit into the process chamber 3.

The main gas inlet channels 220 each have a channel cross-sectional area in the y-z plane, i.e. perpendicular to their extension direction, that is identified in FIG. 4 by the opening diameter q in the y-direction. In the exemplary embodiment shown in FIG. 4, the channel cross-sectional area has a square or rectangular shape and varies at least in a section along the extension direction and/or the distance A of the main gas inlet channels 220, i.e. it is not constant. In FIG. 4, the opening diameter q in a first section of the main gas inlet channels 220 decreases from the gas inlet side 241 of the nozzle element 232 towards the gas outlet side 242, in an adjoining second (middle) section of the main gas inlet channels 220 the opening diameter q is substantially constant. In an adjoining third section that extends up to the gas outlet side 242, the opening diameter q increases towards the gas outlet side 242. In other words, the opening diameter in the third section decreases from the gas outlet side 242 towards the gas inlet side 241. The main gas inlet channels 220 thus comprise from the gas inlet side 241 to the gas outlet side 242, i.e. in the flow direction of the gas, first a convergent section, i.e. a section configured as a nozzle or confuser, then a substantially constant section and then a divergent section, i.e. a section formed as a diffuser. The cross-sectional change along the distance A, i.e. the extension direction of the main gas inlet channels, needs not be realized in the y-direction as shown in FIG. 4. Alternatively or additionally, the cross-sectional change can also be realized in the z-direction, i.e. along the height h' of the nozzle element 232.

A slope of the cross-sectional change, i.e. the cross-sectional decrease in the first section and the cross-sectional increase in the third section of the main gas inlet channels 220, is preferably continuous, i.e. monotonous, in particular strictly monotonous, as shown in FIG. 4. For example, the slope of the cross-sectional change can be linear in the first and/or third section. Alternatively, the cross-sectional change can also be designed in a stepped manner, i.e. discontinuous.

The channel cross-sectional area of the guide gas inlet channels 221, 221' shown in FIG. 4 also varies at least in a section along the extension direction of the guide gas inlet channels 221, 221'. The guide gas inlet channels 221, 221' also have a first section formed as a nozzle, i.e. a first section in which the channel cross-sectional area of the guide gas inlet channels 221, 221' decreases from the gas inlet side 241 towards the gas outlet side 242. Further, the guide gas inlet channels 221, 221' have a second section adjacent to the gas outlet side 242 which has a substantially constant channel cross-sectional area. This second section is first curved and then extends in a straight direction (in the gas flow direction). If an extension direction of the guide gas inlet channels 221, 221' is defined by means of a virtual line running through the geometric centers of the channel cross-sectional areas, a polygonal chain with multiple changes in direction is obtained as the extension direction.

Thus, the guide gas inlet channels 221, 221' here are designed without the third section of the main gas inlet channels 220 in which third section the channel cross-sectional area of the main gas inlet channels 220 increases towards the gas outlet side 242, i.e. the guide gas inlet channels 221, 221' are provided without the third section formed as a diffusor. Thus, on the gas outlet side 242 of the nozzle element 232, the guide gas inlet channels 221, 221' have a channel cross-sectional area which is, for example, 2 or 3 times smaller than that of the main gas inlet channels 220. As a result, the process gas flowing out of the guide gas inlet channels 221, 221' into the process chamber 3 experiences a greater flow velocity during operation of the gas supply device and with the nozzle element 232 being mounted in the device 1 as compared to the flow velocity of the gas flowing out of the main gas inlet channels 220.

The nozzle element 232 shown in FIG. 4 comprises a first column of guide gas inlet channels 221 at a first end of the nozzle element 232 and a second column of guide gas inlet channels 221' at a second end of the nozzle element 232, wherein the first column and the second column are spaced apart in the y-direction and frame the main gas inlet channels 220 between them on two sides. The guide gas inlet channels 221 of the first column differ from the guide gas inlet channels 221' of the second column in an extension direction of the second section, which has a substantially constant channel cross-sectional area and is the section adjacent to the gas outlet side. As shown in FIG. 4, the extension direction of the second section of the guide gas inlet channels 221' of the second column is substantially parallel to the extension direction of the first section of the guide gas inlet channels 221' and parallel to a perpendicular S to an opening area of the gas inlet channels 220, 221, 221'. In contrast, the second section of the guide gas inlet channels 221 of the first column is arranged at an angle γ to the first section of the guide gas inlet channels 221 and thus at an angle α to the perpendicular S that is perpendicular to an opening area of the gas inlet channels 220, 221, 221', which angle α is about 15°. Thus, during operation of the gas supply device and with the nozzle element 232 mounted in the device 1, the gas exits from the guide gas inlet channels 221 at an angle α to the perpendicular S that is perpendicular to an opening area of the gas inlet channels 220, 221, 221'. On the other hand, the gas exits the nozzle element 232 from the main gas inlet channels 220 and the guide gas inlet channels 221' of the second column substantially perpendicular to the opening area of the gas inlet channels 220, 221, 221', i.e. parallel to the perpendicular S, during operation and with the nozzle element 232 mounted.

Furthermore, the nozzle element 232 shown in FIG. 4 comprises a first guide element 204 and a second guide element 205 at the gas outlet side 242 of the nozzle element 232. The first guide element 204 and the second guide element 205 can, for example, be designed as thin plates. Preferably the nozzle element 232 with its elements shown in FIG. 4 is designed as a monolithic component. For example, it can be produced by means of an injection moulding process or an additive manufacturing process from any material, e.g. metal or plastic. The guide elements 204, 205 are preferably provided at the gas outlet side 242 of the nozzle element 232 in a gap-free manner Each of the guide elements 204, 205 has a height extent in the z-direction which preferably corresponds to the height h' of a column of the gas inlet openings 220, 221, 221' and extends in a second direction perpendicular to its height extent by a length d between a first end 215 provided at the gas outlet side 242 of the nozzle element 232 and a second end 216 (shown in FIG. 4 only for the second guide element 205). In the third direction perpendicular to the second direction and to the height extent, the guide elements 204, 205 have a thickness which is several times smaller than each of the height extent and the length d. Thus, the guide elements 204, 205 are substantially composed of two plane, i.e. flat, guide faces 211, 211' and 212, 212', respectively, which are parallel to one another in pairs. In FIG. 4, the guide face 211' of the second guide element 205 is hidden by its guide face 211 and the guide face 212' of the first guide element 204 is hidden by the guide face 212.

The first guide element 204 is arranged to the side of the first column of guide gas inlet channels 221 and on that side of the first column of guide gas inlet channels 221 that faces away from the main gas inlet channels 220, and the second guide element 205 is arranged to the side of the second column of guide gas inlet channels 221' and on that side of the second column of guide gas inlet channels 221' that faces away from the main gas inlet channels 220.

The guide faces 212, 211 are provided at the guide elements 204, 205, respectively, in such a way that they face the guide gas flows 35, 36 (see FIG. 5) flowing through the guide gas inlet channels 221, 221' into the process chamber when the nozzle element 232 is mounted in the device 1 and during operation of the gas supply device (not shown). Accordingly, the guide faces 212', 211' are each provided on that side of the guide element 204 or 205 that faces away from the guide gas flows 35, 36.

The guide elements 204, 205 are preferably arranged at the nozzle element 232 in such a way that they each extend from their first end 215 to their second end 216 parallel to a direction in which gas 30 enters the process chamber through the respective guide gas inlet channels 221, 221' during operation of the gas supply device and when the nozzle element 232 is mounted in the device 1. In other words, the guide elements 204, 205, i.e. their guide faces 211, 211', 212, 212', are preferably provided parallel to the respective extension direction of the second section of the respective guide gas inlet channels 221 or 221'. This means that the first guide element 204, i.e. its guide faces 212, 212', is/are preferably arranged at an angle α to the perpendicular S that is perpendicular to the opening area of the gas inlet channels 220, 221, 221' and the second guide element 205, i.e. its guide faces 211, 211', is/are preferably arranged parallel to the perpendicular S to the opening area of the gas inlet channels 220, 221, 221'.

An advantage of this configuration of the guide gas inlet channels 221 of the first column of guide gas inlet channels 221 is that a change in direction of the gas flowing through the guide gas inlet channel 221 during operation is obtained already within the guide gas inlet channel 221, i.e. in its second section, and not by means of the first guide element 204 or its guide face 212. This leads to a narrower defined direction of the guide gas flow 36 and a reduction of turbulences thereof. In contrast, the guide inlet channels 221' of the second column of guide gas inlet channels 221' shown in FIG. 4 substantially do not have a change in direction.

FIG. 5 shows a schematic view of the surface 18 of the process chamber bottom 4d and the build area 8 from above when using the nozzle element 232 shown in FIG. 4 as the gas inlet, as well as an example of gas flows generated in the process chamber 3 during operation of the gas supply device. In this view, the gas flows are exemplarily depicted in a sectional plane parallel to the build area (x-y plane), which sectional plane is located in the lower altitude region of the process chamber. For reasons of clarity, the guide elements 204, 205 shown in FIG. 4 are not shown in FIG. 5. Moreover, only a few of the partial gas inlet flows 31 (see below) are shown as an example and not all of them.

FIG. 5 shows analogous elements of the device 1 as the FIGS. 3a and 3b, the description of which elements is therefore not repeated here.

As shown in FIG. 5, the nozzle element 232 is preferably arranged at or outside the process chamber 3 in such a way that its gas outlet side 242 is provided substantially flush with the inside of the side wall 4b of the process chamber.

The partial gas inlet flows 31, which flow through the main gas inlet channels 220 of the nozzle element 232 into the process chamber 3, form a main flow 30, which flows through the process chamber 3 substantially in a main flow direction from the gas inlet 232 and 32 to the gas outlet 34, i.e. in the x-direction, and thus flows across the build area 8. Perpendicular to the build area 8 and the working plane 7, i.e. in the z-direction, the main flow 30 extends substantially over the lower altitude region of the process chamber 3 (not shown in FIG. 5). Analogously, the partial gas inlet flows (not shown in FIG. 5) flowing through the guide gas inlet channels 221 of the first column of guide gas inlet channels form a first guide gas flow 36 and the partial gas inlet flows flowing through the guide gas inlet channels 221' of the second column of guide gas inlet channels form a second guide gas flow 35. The guide gas flows 35, 36 each flow through the process chamber 3 at the side of the main flow 30 with respect to the y-direction. The first guide gas flow 36 flowing through the first column of guide gas inlet channels 221 enters the process chamber at the angle α to the vertical S that is vertical to the opening area of the gas inlet channels. i.e. at the angle α to the main flow direction of the main flow 30, as described above, whereas the second guide gas flow 35 flows into the process chamber substantially parallel to the main flow direction. With this differing configuration of the guide gas flows 35, 36, a specific reaction is made to the different dimensions of those regions within the process chamber 3 in which the process gas can flow in a directional or non-directional manner. At the top of FIG. 5, the recoater 16 is arranged in a rest position within the process chamber, which has a significant influence on the flow of the process gas in this region of the process chamber 3 due to its length and height extent. A distance between the build area 8 or the main flow 30 and the recoater 16, being the closest significantly flow-influencing element, is relatively small. It is sufficient to provide the second guide gas flow 35 at no angle or with only a small angle to the main flow 30, since in the region of the process chamber 3 between the second guide gas flow 35 and the housing of the recoater 16, in which region no defined flow is generated, no significant disturbance or secondary flows 37 can form. Below in FIG. 5, the distance between the main flow 30 and the process chamber wall 4, being the closest significant flow-influencing element, is relatively large, so that the probability for an occurrence of significant disturbance or secondary flows 37 is higher, which disturbance or secondary flows reduce the homogeneity of the main flow 30, e.g. cause constrictions and/or a local reduction of the flow velocity. The first guide gas flow 36 that is provided at the angle α anticipates undesired effects of the disturbance or secondary flows 37. As shown in FIG. 5, its initial flow direction—schematically depicted by the second flow arrow from left—changes while it flows substantially as a free jet through the process chamber 3 close to the build area. It finally assumes an orientation parallel to the main gas flow 30. The change in direction represented in this example by the second flow arrow is due to the effect of the disturbance or secondary flows 37 in a direction transverse to its initial flow direction. Without the initially set deflection by the angle α, the first guide gas flow 36 would possibly be diverted towards the build area 8, as a result of which the main gas flow 30 might be narrowed or its efficiency in the removal of atmospheric impurities restricted. Ultimately, the first guide gas flow 36, being configured in this way, thus ensures that a predefined minimum width of the main flow 30 is reliably maintained at least as long as the main flow 30 flows across the build area 8. Thus, the first guide gas flow 36 is positioned within the process chamber 3 between the main flow 30 and the disturbance or secondary flows 37 in such a way that it is always located not above the build area 8. The guide gas flow 36 thus serves as a boundary zone according to the present invention. The larger volumetric flow rate of the first guide gas flow 36 promotes a spatial stability or relative positional stability of the boundary zone even with the fluctuations to which a complex system of interacting flows is typically subject.

As also described above, the volumetric flow rate of the guide gas flows 35, 36 flowing in through the guide gas inlet channels 221, 221' is larger than the volumetric flow rate of the partial gas inlet flows 31 of the main flow 30 flowing in from the main gas inlet channels 220. This causes the flow velocity of the guide gas flows 35, 36 to remain high over a longer distance after entering the process chamber 3 than the flow velocity of the main flow 30.

Analogous to FIG. 3b, the angle α at which the guide gas flow 36 enters the process chamber 3 thus takes into account an influence on the guide gas flow 36 by the disturbance or secondary flow 37 in such a way that the guide gas flow 36 flows substantially parallel to the main flow 30 in its further course of flow, i.e. substantially along the main flow direction, as well as at the side of the main flow 30 and/or in a region outside the build area 8. Thus, the guide gas flows 35, 36 flank the main flow 30 at least in a section and thus provide for guidance or screening of at least a section of the main flow 30 and form a boundary zone according to the present invention.

By introducing the guide gas flows 35, 36 into the process chamber 3 through the guide gas inlet channels 221, 221' formed separately in the nozzle element 232 and introducing the main flow 30 through the main gas inlet channels 30, it is possible, for example, to achieve different flow velocities of the main flow 30 and the guide gas flows 35, 36, as described above. Thus, for example, a main flow 30 can be provided whose flow properties are substantially set in such a way that a cleaning effect as good as possible is achieved above the build area 8 and blowing of building material in powder form from the build area 8 is minimized. For example, the flow properties of the guide gas flows, which do not flow above the build area but laterally offset from it, can be adjusted in such a way that they meet requirements such as a specific directional stability and insensitivity to undesired disturbance or secondary flows. For example, the guide gas flows can flow with significantly higher, e.g. two times higher, velocities than the main flow, since they occur at a lateral distance from the build area and from the building material processed there, which building material can be blown away, and thus the guide gas flows do not significantly impair the additive manufacturing process.

In accordance with the invention, as already described above with reference to FIGS. 2 to 3b, the guide faces 211, 212 facing the guide gas flows 35, 36 serve to guide at least a section of the guide gas flows 35, 36. Likewise, the guide faces 211', 212' facing away from the guide gas flows 35, 36 serve to guide at least a section of the guide gas flows 35, 36 by shielding them from the disturbance or secondary flow 37. Thus, the guide elements 204, 205 form a boundary zone according to the present invention.

The nozzle element 232 described in relation to the second embodiment of the present invention can be further developed according to the features described above with reference to the first embodiment of the invention (perforated plate 132), as far as this can be implemented. For example, the guide elements 204, 205 can have another shape and/or arrangement than the one described. For example, further guide elements can also be provided between the main gas inlet channels 220 and the guide gas inlet channels 221, 221'. The nozzle element 232 can also be provided without guide elements, i.e. apart from the main gas inlet channels, merely guide gas inlet channels can be provided or the main gas inlet channels themselves can be used to introduce the guide gas flows 35, 36, for example by means of guide elements suitably attached to the nozzle element.

FIG. 4 shows a nozzle element with substantially square or rectangular channel cross-sectional areas of the gas inlet channels. However, the channel cross-sectional areas of the gas inlet channels can also deviate from a rectangular or square shape, for example, they can have a circular or triangular or any other shape. Also, the gas inlet channels do not need to have the variation of their cross-section along their extension direction described above. For example, a cross-sectional change can be implemented differently or the channel cross-sectional area can be constant over the entire extension direction of the gas inlet channels.

Figure 6:
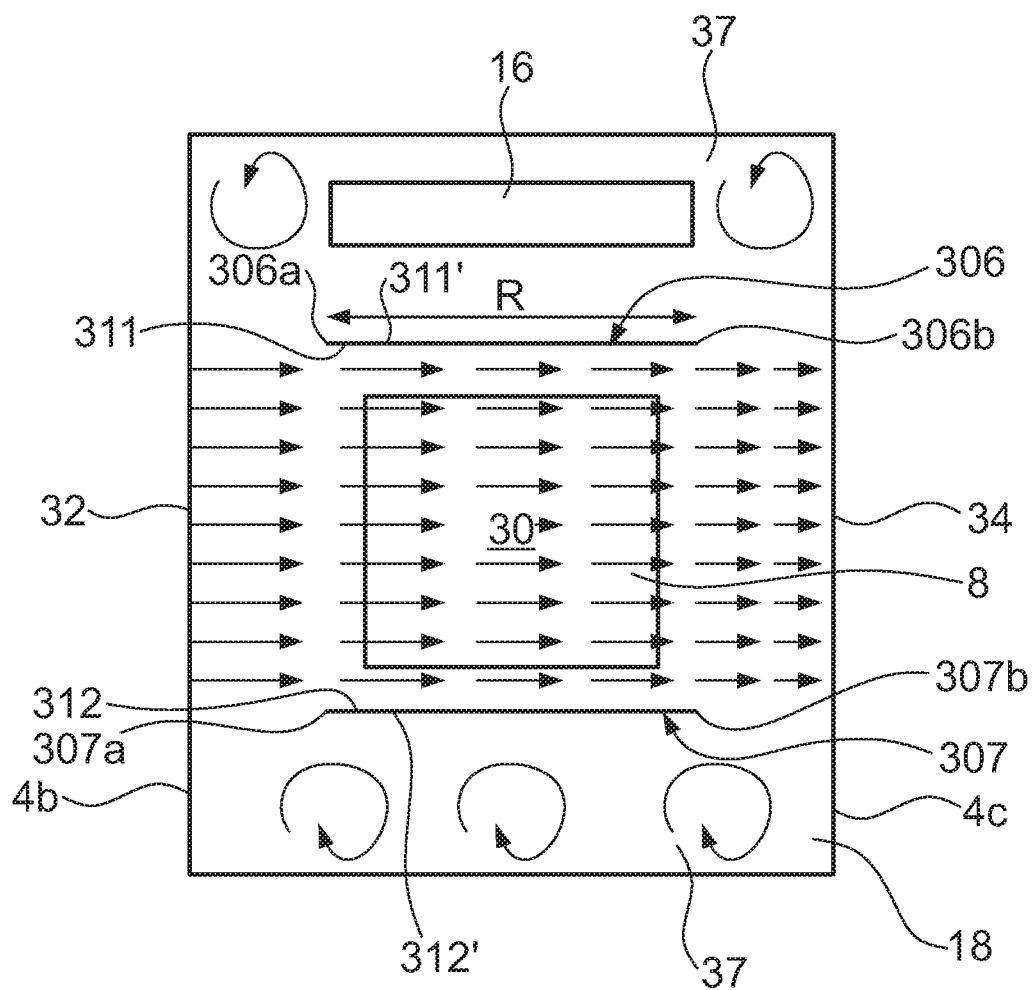
FIG. 6 shows a schematic view in cross-section of an embodiment of a process chamber of the device shown in FIG. 1 in a view of the build area from above in accordance with a third embodiment of the invention, exemplarily and schematically showing gas flows generated during operation of a gas supply device provided in the device.

According to a third embodiment of the invention, further guide elements 306, 307 are provided instead of the guide gas flows 35, 36 shown in FIG. 3b and FIG. 5. The guide elements 306, 307 are shown in FIG. 6 in a schematic view of the surface 18 of the process chamber bottom 4d from above.

The guide elements 306, 307 can, for example, be designed as dimensionally stable, thin sheets. They each have a height extent in the z-direction (not shown in FIG. 6), which preferably corresponds at least to the first height $h_1$ up to which the lower altitude region of the process chamber extends (see FIG. 1), e.g. one and a half times the first height $h_1$. In a second direction perpendicular to the height extent, the guide elements 306, 307 each extend from a first end 306a or 307a to a second end 306b or 307b over a length R, which length R preferably corresponds at least to the length N of the build area (see FIG. 3a). In the third direction perpendicular to the second direction and to the height extent, the guide elements 306, 307 each have a thickness which is several times smaller than the height extent and the length R, which is why each of the guide elements 306, 307 is shown in the view from above in FIG. 6 as a line. Thus, each of the guide elements 306, 307 substantially has two plane, i.e. flat, guide faces 311, 311' and 312, 312' which are parallel in pairs. The guide faces 311, 312 each are provided at that side of the guide element 306 or 307 that faces the main flow 30. The guide faces 311', 312' each are arranged at that side of the guide element 306 or 307 that faces away from the main flow 30.

The guide elements 306, 307 are arranged in the device 1 in the area of the surface 18 of the process chamber bottom 4d, i.e. outside of the build area 8. The guide elements 306, 307 are preferably provided at a distance from the gas inlet 32, as shown in FIG. 6, i.e. they are not directly adjacent to the gas inlet 32. Thus, their respective first end 306a, 307a is located at a distance greater than zero from the gas inlet 32, for example at a distance of 5 cm, 10 cm or 20 cm. The second end 306b, 307b of the guide elements 306, 307 each is located further away from the gas inlet 32 than the first end 306a, 307a. The guide faces 311, 312 of the guide elements 306, 307 each extend parallel to the main flow direction of the main flow 30. They are arranged on opposite sides of the build area 8 so that they flank the build area 8 at least in a section or form a flow channel for at least a section of the main flow 30, which flow channel is open to the top and is bounded at the bottom by the surface 18 of the process chamber bottom 4d and the build area 8 in the z-direction. The flow channel formed by the guide elements 306, 307 and the build area 8 is stationary, i.e. fixed in its place, at least during the selective solidification of the building material.

In particular the guide faces 311, 312 facing the main flow 30 provide for guidance of the main flow 30, i.e. they prevent the main flow from spreading and/or diverting in the y-direction. In particular the guide faces 311', 312' facing away from the main flow 30 provide for shielding of the main flow 30 from the disturbance or secondary flow 37, i.e. the guide faces 311', 312' keep the disturbance or secondary flow away from the main flow 30 at least in a section of the main flow, i.e. over the length of their extent. Thus, the guide elements 306, 307 form a boundary zone according to the present invention.

The gas inlet shown schematically in FIG. 6 can, for example, be designed as a perforated plate according to FIG. 2 or as a nozzle element according to FIG. 4 or can comprise such a perforated plate or nozzle element. In that, the perforated plate can preferably be provided without the guide gas inlet openings 121 and the guide elements 102a, 102b, 103a, 103b, which frame the guide gas inlet openings 121 in sections. Alternatively or additionally, the nozzle element can be provided without the guide gas inlet channels 221, 221' and without the guide elements 204, 205.

The features of the above-described three embodiments of the present invention can be combined among each other. For example, a guide gas flow 35 or 36 can be provided on a first side of the build area and a guide element 306 or 307 can be provided on a second side of the build area opposite to the first side.

FIGS. 3a, 3b, 5 and 6 show a rectangular build area, wherein the length $L_1$ of the perforated plate 132 or of the nozzle element 232, in general the length $L_1$ of the gas inlet 32 in the y-direction, over which the main gas flow 30 is introduced into the process chamber 3, is preferably adapted to the width M of the build area 8, i.e. an extent of the build area in the y-direction (see FIG. 3a). The shape of the build area 8 can also differ from a rectangular shape, for example, the build area can have a circular shape. In this case, the length $L_1$ of the gas inlet 32 can be adapted to a diameter of the build area 8. In that, preferably the length $L_1$ of the gas inlet 32 is greater than the corresponding extent of the build area 8, in particular at least 110%, more preferably at least 120% of this extent.

According to a further development of the invention, at least one of the guiding elements 101a, 101b, 102a, 102b, 103a, 103b, 204, 205, 306, 307 is not fixed in its place in the process chamber 3 but is movably provided in the process chamber 3. The guide elements 101a, 101b, 102a, 102b, 103a, 103b, 204, 205, 306, 307 can, for example, be displaceable provided and/or provided to be folded and/or pivotably provided in the process chamber 3 or at the perforated plate 132 or the nozzle element 232. For example, the guide elements 306, 307 described with reference to FIG. 6 can be configured to be pivotable or displaceable out of the process chamber bottom 4d so that they do not impede the passage of the recoater 16 or so that an evasion of the guide elements 306, 307 is coordinated with the movement of the recoater 16, e.g. via a mechanical or electronic coupling. Furthermore, at least the guide element 306 located closest to the recoater can be provided at the recoater 16 and can be brought into an operative position (see below) by moving the recoater 16. In particular the guide elements 101a, 101b, 102a, 102b, 103a, 103b, 204, 205 attached to the perforated plate 132 or the nozzle element 232 can be configured as pivotable guide elements, for example by attaching them to the perforated plate or the nozzle element by means of a hinge.

FIGS. 3a, 3b, 5 and 6 each show the recoater 16 in a rest position that is depicted above the build area 8 in the depiction of each of the figures. A rest position of the recoater 16 can also be on the opposite side (in the depiction of the figures the lower side) of the build area 8. Preferably the recoater 16 assumes the respectively other rest position after each recoater travel, i.e. it moves once across the build area 8 for an application process and is then positioned next to the opposite side of the build area in its rest position outside the build area until it moves across the build area 8 again during a subsequent application movement and assumes its starting position. Providing of at least one flow in the process chamber is preferably adapted to this alternating positioning of the recoater, for example by a corresponding control of the guide gas flows 35, 36 and/or by a symmetrically designed gas inlet (see the perforated plate 132 shown in FIGS. 2 and 3a and the resulting approximately symmetrical outflowing guide gas flows 35, 36 in FIG. 3b).

In FIGS. 1 to 6, the structural guide elements are each shown in an operative position in which they are configured, as described above, to guide at least a section of a directed or undirected gas flow generated in the process chamber 3 and thus to function as a boundary zone according to the present invention. However, if the guide elements are displaced or folded away or pivoted and thus brought from the operative position to a rest position that differs from the operative position, they are preferably not suitable for guiding a gas flow, i.e. they do not serve as a boundary zone.

According to the invention, the guide elements are therefore positioned in the operative position at least during the selective solidification of the building material so that they serve as a boundary zone at least during the selective solidification of the building material. Due to the usual successively or alternating implementation of the process steps of selective solidification and application of a layer of the building material, the guide elements are typically in their respective operative position in the interval between two application processes, e.g. during selective solidification of a single layer. If the operative position or the rest position of individual guide elements does not necessarily need to be coordinated with the movable recoater, in these cases these individual guide elements can also assume their operative position during the selective solidification of a plurality of layers, an entirety of the layers of one or more objects or an entirety of the layers of an entire building process. This can reduce a number of adjustment operations.

Instead of or in addition to the above-described measures for generating and/or positioning a boundary zone that separates and/or bounds the main flow 30 at least in a section thereof against the disturbance or secondary flow 37, i.e. effects a spatial separation of the flows, the disturbance or secondary flow 37 (see FIGS. 3b, 5, 6) can also be modified in a controlled manner at least in a section and/or displaced in a controlled manner at least in a section. Modifying the secondary flow means modifying its flow properties, in particular its flow direction and/or its flow velocity and/or its volumetric flow rate.

A first measure for modifying the disturbance or secondary flow is the generation of a guide gas flow 35, 36 described above. As an alternative or in addition to the guide gas flow, an additional secondary gas outlet can be provided in the process chamber 3 that is provided within the lower altitude region of the process chamber 3 from the working plane 7 to the first height $h_1$ (see FIG. 1) and is arranged in the region above the surface 18 of the process chamber bottom 4d, i.e. outside the build area 8. At least a portion of the secondary flow is discharged through the secondary gas outlet so that it cannot influence the main flow 30 or influence the main flow only slightly.

Furthermore, a further gas flow can be introduced into the process chamber, for example through a further secondary gas inlet, which further gas flow flows through at least a section of the process chamber within the lower altitude region of the process chamber 3 from the working plane 7 to the first height $h_1$ (see FIG. 1) and in the region above the surface 18 of the process chamber bottom 4d, i.e. outside the build area 8. In doing so, the further gas flow is introduced into the process chamber in such a way that it is at least sectionally directed in an opposite direction to the secondary flow and/or arrives at the secondary flow at an angle to it and/or has a larger flow velocity and/or a larger volumetric flow rate than the secondary flow.

Preferably, the main flow 30 and the secondary flow 37 are simulated in advance using a computer program and, based on the simulation, suitable measures for improving the flow properties, in particular the homogeneity of the main flow, are determined, i.e. a boundary zone that is suitable for the respective framework conditions is determined. Such framework conditions are, for example, device specific framework conditions such as the size and/or arrangement of the build area in the process chamber, as well as process specific framework conditions such as the type of building material used, solidification parameters under which the selective solidification of the building material takes place, etc. This can be implemented, for example, by the control unit itself or by a computer provided separately from the device. Preferably, the computer program for determining a suitable boundary zone is configured to implement an algorithm for implementing machine learning, i.e. a "self-learning" algorithm is preferably provided. Alternatively or additionally, the algorithm is suited for iteratively determining a suitable boundary zone, i.e. for gradually adapting the boundary zone in the light of improving the flow properties of the main flow.

Although the present invention was described by means of a laser sintering or laser melting device, it is not limited to laser sintering or laser melting. It can be applied to any process for the additive production of a three-dimensional object by applying, layer by layer, and selectively solidifying a building material.

The irradiation device can, for example, comprise one or several gas or solid state lasers or any other kind of laser, such as laser diodes, in particular VCSEL (Vertical Cavity Surface Emitting Laser) or VECSEL (Vertical External Cavity Surface Emitting Laser), or an array of these lasers. In general, any device can be used as irradiation device which device is suited to selectively introduce energy onto a layer of the building material. Instead of a laser, for example another light source, an electron beam or any other source of energy or of radiation suited to solidify the building material may be used. The invention may also be applied to selective mask sintering, wherein an extended light source and a mask are used, or to high-speed-sintering (HSS), wherein a material is selectively applied onto the building material, which material enhances (absorption sintering) or reduces (inhibition sintering) the absorption of radiation at the corresponding locations and is then unselectively irradiated over a large area or by a movable array irradiation device.

Instead of introducing energy, the selective solidification of the applied building material can also be performed by means of 3D printing, for example by applying an adhesive. Generally, the invention relates to additively producing an object by means of applying, layer by layer, and selectively solidifying of a building material in powder form regardless of the manner in which the building material is solidified.

The invention claimed is:

1. A method of providing a flow for a process chamber of a device for producing a three-dimensional object by layer-wise application and selective solidification of a building material in a build area, comprising:

supplying a process gas to the process chamber in a lower altitude region of the process chamber, the process chamber comprising a gas inlet for introducing the process gas into the process chamber and a gas outlet for discharging the process gas from the process chamber, wherein the gas inlet and the gas outlet are provided in the lower altitude region of the process chamber and the process gas flows in a main flow from the gas inlet to the gas outlet, and wherein a secondary flow is located in a sub-region of the lower altitude region, the sub-region being located above a bottom surface of the process chamber surrounding the build area;

positioning a boundary zone between the secondary flow and the main flow at least along a portion of the main flow and/or the secondary flow and at least during the selective solidification of at least one layer of the building material and in the sub-region of the lower altitude region that is located above the bottom surface surrounding the build area, due to at least one of the following influencing measures:

influencing measure I: positioning at least one guide element as a boundary zone in the process chamber, wherein the at least one guide element includes at least one guide face for guiding the main flow and/or the secondary flow;

influencing measure II: providing, as a boundary zone, a flow zone between the main flow and the secondary flow by modifying the flow properties of the secondary flow;

influencing measure III: providing, as a boundary zone, a flow zone between the main flow and the secondary flow by displacing the secondary flow at least in a section thereof.

2. The method of claim 1, wherein a maximum horizontal extent of the gas inlet and/or of the gas outlet corresponds to at least 80% of a length of an adjacent build area side of a rectangular build area and/or a longest build area diagonal of a polygonal build area and/or a build area diameter of a circular build area.

3. The method of claim 1 further comprising using the influencing measure I, wherein the at least one guide element has a first end which is positioned at the gas inlet at least during the selective solidification of at least one layer of the building material.

4. The method of claim 3, wherein the first end has a vertical dimension that is larger than or equal to a vertical extent of an opening of the gas inlet.

5. The method of claim 3, wherein the guide element is positioned such that in an orthogonal projection of the gas inlet and the guide element onto a plane of the build area, an opening of the gas inlet is arranged at a first distance from the build area and a second end of the guide element is arranged at a second distance from the build area, wherein the second distance is at least 1 cm smaller than the first distance.

6. The method of claim 3, wherein the guide element is positioned such that in an orthogonal projection of the gas inlet onto a plane of the build area, the guide face of the at least one guide element is oriented perpendicular to a plane of the gas inlet opening.

7. The method of claim 3, wherein the guide element is positioned such that in an orthogonal projection of the gas inlet onto a plane of the build area, the guide face of the at least one guide element is oriented at an angle larger than 0° to a perpendicular to a plane of the gas inlet opening, wherein the gas inlet includes a plurality of inlet channels and the guide face and extension directions of the inlet channels form an angle of at least 3°.

8. The method of claim 3, wherein at least two of the guide elements are positioned in the process chamber and wherein a first one of the guide elements is positioned at a first end of the gas inlet and a second one of the guide elements is positioned at a second end of the gas inlet.

9. The method of claim 1, further comprising using the influencing measure I, wherein the at least one guide element is positioned in the process chamber spaced away from the gas inlet.

10. The method of claim 9, wherein the at least one guide element is positioned such that in an orthogonal projection of the gas inlet onto a plane of the build area, the guide face of the guide element is oriented perpendicular to a plane of the gas inlet opening or is oriented at an angle of 30° at most.

11. The method of claim 9, wherein at least two guide elements are positioned in the process chamber such that in an orthogonal projection of the guide elements onto a plane of the build area, the guide elements flank the sides of a rectangular build area, the sides being arranged mutually parallel.

12. The method of claim 3, wherein the at least one guide element is configured and/or positioned to be movably provided in the process chamber.

13. The method of claim 1, further comprising implementing the influencing measure II, wherein the secondary flow is modified by introducing at least one guide gas flow into the process chamber, wherein at least a section of the at least one guide gas flow flows through the sub-region of the lower altitude region that is located above the bottom surface surrounding the build area.

14. The method of claim 13, wherein the guide gas flow has a maximum velocity which is at least 20% larger and/or a volumetric flow rate per unit element which is at least 20% larger than the main flow.

15. The method of claim 13, wherein the guide gas flow is introduced at an angle larger than 0° away from the direction of the main flow.

16. The method of claim 1, further comprising:

using the influencing measure II;

providing a secondary gas outlet in the process chamber in the sub-region of the lower altitude region that is located above a bottom surface of the process chamber surrounding the build area; and at least partially discharging the secondary flow from the process chamber through the secondary gas outlet.

17. The method of claim 1, further comprising:

using the influencing measure III; and providing a further gas flow for displacing the secondary flow at least in a portion of the secondary flow, wherein the further gas flow is at least partially directed in an opposite direction to the secondary flow and/or obliquely arrives at the secondary flow and/or has a larger flow velocity and/or a larger volumetric flow rate than the secondary flow.

18. A method of producing a three-dimensional object in a device for producing a three-dimensional object by layer-wise application and selective solidification of a building material in a build area within a process chamber, wherein at least during the selective solidification of at least one layer of the building material, the method comprises:

providing a flow for a process chamber of the device for producing the three-dimensional object by layer-wise application and selective solidification of the building material in the build area;

supplying a process gas to the process chamber in a lower altitude region of the process chamber, the process chamber comprising a gas inlet for introducing the process gas into the process chamber and a gas outlet for discharging the process gas from the process chamber, wherein the gas inlet and the gas outlet are provided in the lower altitude region of the process chamber and the process gas flows in a main flow from the gas inlet to the gas outlet, and wherein a secondary flow is located in a sub-region of the lower altitude region, the sub-region being located above a bottom surface of the process chamber surrounding the build area; and positioning a boundary zone between the secondary flow and the main flow at least along a portion of the main flow and/or the secondary flow and at least during the selective solidification of at least one layer of the building material and in the sub-region of the lower altitude region that is located above the bottom surface surrounding the build area, due to at least one of the following influencing measures;

influencing measure I: positioning at least one guide element as a boundary zone in the process chamber, wherein the at least one guide element includes at least one guide face for guiding the main flow and/or the secondary flow;

influencing measure II: providing, as a boundary zone, a flow zone between the main flow and the secondary flow by modifying the flow properties of the secondary flow;

influencing measure III: providing, as a boundary zone, a flow zone between the main flow and the secondary flow by displacing the secondary flow.

19. The method of claim 9, wherein the at least one guide element is movably provided in the process chamber.

20. The method of claim 14, wherein the maximum velocity and/or the volumetric flow rate per unit element of the guide gas flow exceeds a maximum velocity and/or a volumetric flow rate per unit element of the main gas flow at least in a flow portion of the guide gas flow directly after entering the process chamber.

21. The method of claim 19, wherein the at least one guide element is configured and/or positioned in the process chamber such that it is able to travel and/or pivot in the process chamber.

* * * * *